US010222898B2

(12) United States Patent
Ito et al.

(10) Patent No.: US 10,222,898 B2
(45) Date of Patent: Mar. 5, 2019

(54) DISPLAY DEVICE WITH TOUCH DETECTION FUNCTION AND DISPLAY SYSTEM

(71) Applicant: Japan Display Inc., Tokyo (JP)

(72) Inventors: Daisuke Ito, Tokyo (JP); Koji Noguchi, Tokyo (JP); Hidetoshi Komatsu, Tokyo (JP); Toshiaki Fukushima, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 31 days.

(21) Appl. No.: 15/170,120

(22) Filed: Jun. 1, 2016

(65) Prior Publication Data

US 2016/0357320 A1    Dec. 8, 2016

(30) Foreign Application Priority Data

Jun. 5, 2015   (JP) .................................. 2015-115221
Jul. 16, 2015  (JP) .................................. 2015-142319

(51) Int. Cl.
*G06F 3/041*     (2006.01)
*G06F 3/044*     (2006.01)
(Continued)

(52) U.S. Cl.
CPC .......... *G06F 3/0416* (2013.01); *G06F 1/3262* (2013.01); *G06F 3/038* (2013.01);
(Continued)

(58) Field of Classification Search
None
See application file for complete search history.

(56) References Cited

U.S. PATENT DOCUMENTS

2012/0050217 A1   3/2012  Noguchi et al.
2014/0145986 A1   5/2014  Kuroiwa et al.
(Continued)

FOREIGN PATENT DOCUMENTS

CN    102375639    3/2012
CN    104238850    12/2014
(Continued)

OTHER PUBLICATIONS

Chinese Office Action dated Jul. 13, 2018 in corresponding Chinese Application No. 201610368530.0.
(Continued)

*Primary Examiner* — Duane N Taylor, Jr.
(74) *Attorney, Agent, or Firm* — K&L Gates LLP

(57) ABSTRACT

According to an aspect, a display device with a touch detection function includes a display panel and a touch panel. The touch panel includes first electrodes extending in one direction. The display panel includes second electrodes interesting with the first electrodes in planar view and serving as common electrodes that supply a common potential to pixels in a display area. The display panel also includes pixel signal lines and scanning signal lines interesting with each other in planar view. The pixel signal lines and the scanning signal lines are made into a floating state in a touch detection period in which a first drive signal is applied to the first electrodes, and a second drive signal is applied to the second electrodes at predetermined intervals to perform touch detection based on change in voltage of the first electrodes and change in voltage of the second electrodes.

12 Claims, 15 Drawing Sheets

(51) Int. Cl.
*G06F 1/3234* (2019.01)
*G06F 3/038* (2013.01)
*G06F 3/0488* (2013.01)
*G02F 1/1333* (2006.01)

(52) U.S. Cl.
CPC ............ *G06F 3/044* (2013.01); *G06F 3/0412* (2013.01); *G06F 3/04883* (2013.01); *G02F 1/13338* (2013.01); *Y02D 50/20* (2018.01)

(56) References Cited

U.S. PATENT DOCUMENTS

2014/0362042 A1    12/2014    Noguchi et al.
2015/0077387 A1*    3/2015    Han .................. G06F 3/044
                                                            345/174
2015/0091843 A1    4/2015    Ludden
2015/0103034 A1    4/2015    Shepelev et al.
2015/0261348 A1*    9/2015    Jang .................. G06F 3/044
                                                            345/174
2016/0188142 A1*    6/2016    Oh ..................... G09G 3/36
                                                            345/174

FOREIGN PATENT DOCUMENTS

| JP | 2012-48295 | 3/2012 |
| JP | 2014106865 | 6/2014 |
| JP | 2014241049 | 12/2014 |
| JP | 2015-72686 | 4/2015 |
| WO | 2015/057349 | 4/2015 |

OTHER PUBLICATIONS

Japanese Office Action dated Nov. 6, 2018 in corresponding Japanese Application No. 2015-142319.

* cited by examiner

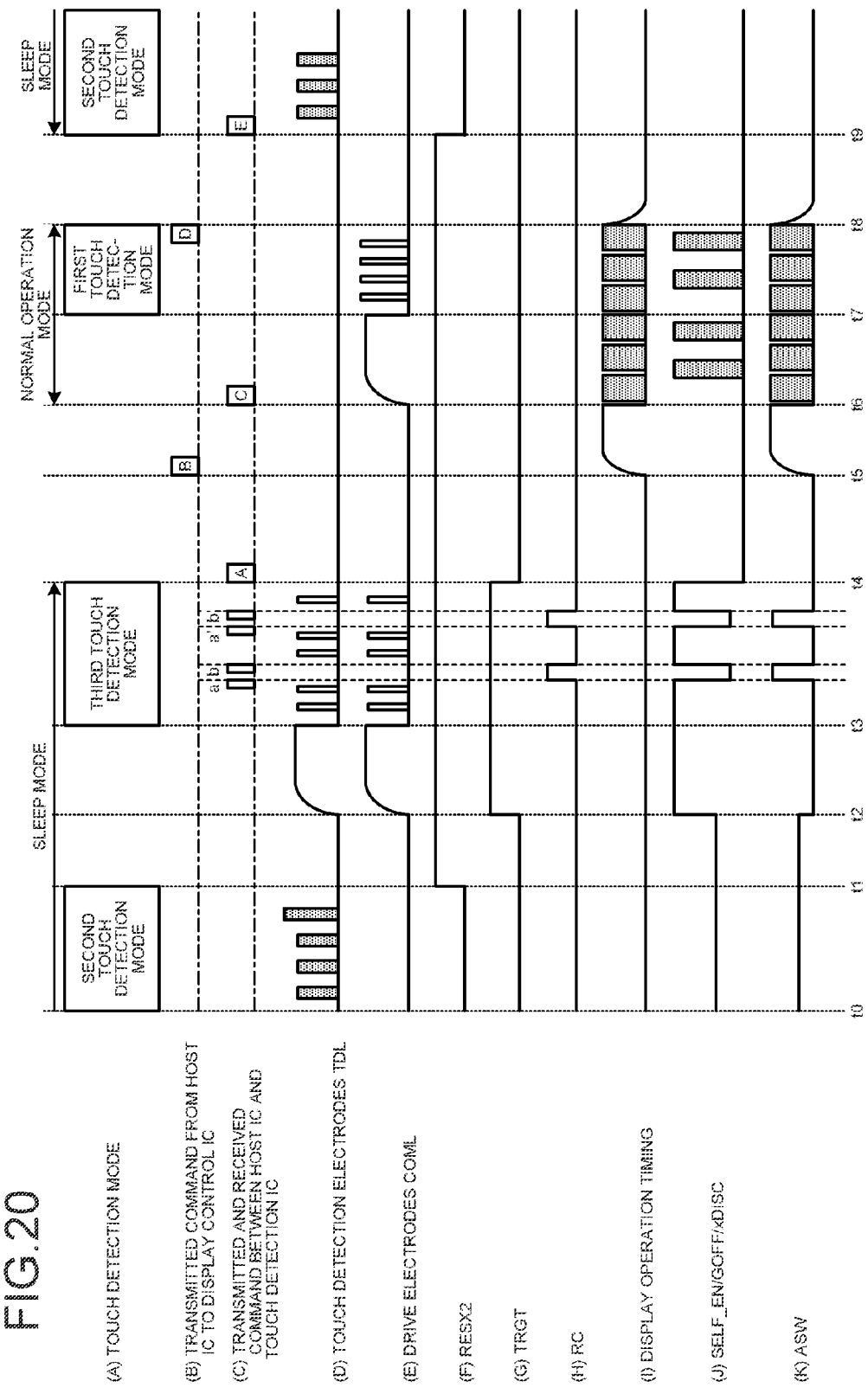

DISPLAY DEVICE WITH TOUCH DETECTION FUNCTION AND DISPLAY SYSTEM

CROSS-REFERENCE TO RELATED APPLICATIONS

This application claims priority from Japanese Application No. 2015-115221, filed on Jun. 5, 2015, and Japanese Application No. 2015-142319, filed on Jul. 16, 2015, the contents of which are incorporated by reference herein in its entirety.

BACKGROUND

1. Technical Field

The present invention relates to a display device with a touch detection function and a display system.

2. Description of the Related Art

Display panels with a touch detection function have recently been attracting attention. Such display panels are obtained by mounting a contact detecting device called a touch panel on a display device, such as a liquid-crystal display device, or integrating the touch panel with the display device. The display panels display various button images and other images on the display device instead of having typical mechanical buttons to receive information. Because the display panels with a touch panel require no input device, such as a keyboard, a mouse, or a keypad, they are increasingly used with computers, portable electronic apparatuses, such as mobile phones, and other equipment.

Examples of touch panel technologies include optical, resistive, and capacitive technologies. Capacitive touch panels, for example, are used as a touch panel integrated with a display panel to constitute a display panel with a touch detection function of a display device. In such a display device, common electrodes for display originally included in the display device are also used as drive electrodes for touch detection.

Display devices with a touch detection function designed for electronic apparatuses, such as mobile phones and tablets, preferably have a normal operation mode and a sleep mode. In the normal operation mode, the display devices with a touch detection function perform both image display and touch detection. In the sleep mode, the display devices with a touch detection function stop displaying an image and cause each unit to stop operating when no operation is performed for a certain period of time, thereby reducing power consumption.

Japanese Patent Application Laid-open Publication No. 2014-241049 (JP-A-2014-241049), for example, describes a display device with a touch detection function. In a sleep mode, the display device determines whether a touch operation is performed using a self-capacitive technology. If the display device detects a touch operation, the display device detects a touch coordinate position and a gesture (movement of an external proximity object, such as a finger) using a mutual-capacitive technology. If the display device detects a predetermined gesture, the display device shifts to a normal operation mode.

The display device with a touch detection function described in JP-A-2014-241049 detects a touch coordinate position and/or a gesture using the mutual-capacitive technology in the sleep mode. In typical display devices with a touch detection function obtained by integrating a display panel with a touch panel, not only common electrodes but also a component that drives the common electrodes as drive electrodes for touch detection is shared for display use and touch detection use. The component that drives the common electrodes as drive electrodes for touch detection is frequently included in a device for display. Therefore, a case where a display device with a touch detection function obtained by integrating a display panel with a touch panel performs a gesture detection function using the mutual-capacitive technology in the sleep mode may possibly require high power consumption, compared with a case where a display device including a display panel with a touch detection function obtained by providing a touch panel on a display surface of a display device of a device for display control performs a gesture detection function in the sleep mode.

For the foregoing reasons, there is a need for a touch detecting device, a display device with a touch detection function, and a display system that provide low power consumption when performing a gesture detection function in a sleep mode as a configuration including a display panel with a touch detection function obtained by integrating a display panel with a touch panel.

SUMMARY

According to an aspect, a display device with a touch detection function includes a display panel that displays an image, and a touch panel that detects touch input and is integrated with the display panel. The touch panel includes a plurality of first electrodes extending in one direction. The display panel includes a plurality of second electrodes interesting with the first electrodes in planar view and serving as common electrodes that supply a common potential to a plurality of pixels in a display area in which the image is displayed, and a plurality of pixel signal lines and a plurality of scanning signal lines interesting with each other in planar view. The pixel signal lines and the scanning signal lines are made into a floating state in a touch detection period in which a first drive signal is applied to the first electrodes, and a second drive signal is applied to the second electrodes at predetermined intervals to perform touch detection based on change in voltage of the first electrodes and change in voltage of the second electrodes.

According to another aspect, a display system includes the display device with a touch detection function, and a processing unit that controls the display device with a touch detection function. The touch detection period is a period to perform touch detection in a sleep mode in which an image display function of displaying an image on the display panel is stopped. The processing unit stores therein a gesture that defines a trajectory pattern on the touch panel to shift a mode of the display device with a touch detection function from the sleep mode to a normal operation mode in which the image display function is performed, and shifts, when a trajectory of coordinates detected in the touch detection period satisfies a predetermined condition defined as the trajectory pattern, the mode of the display device with a touch detection function from the sleep mode to the normal operation mode.

BRIEF DESCRIPTION OF THE DRAWINGS

FIG. 20 is an exemplary timing chart of operations performed by the display system according to the third embodiment.

DETAILED DESCRIPTION

Figure 1:
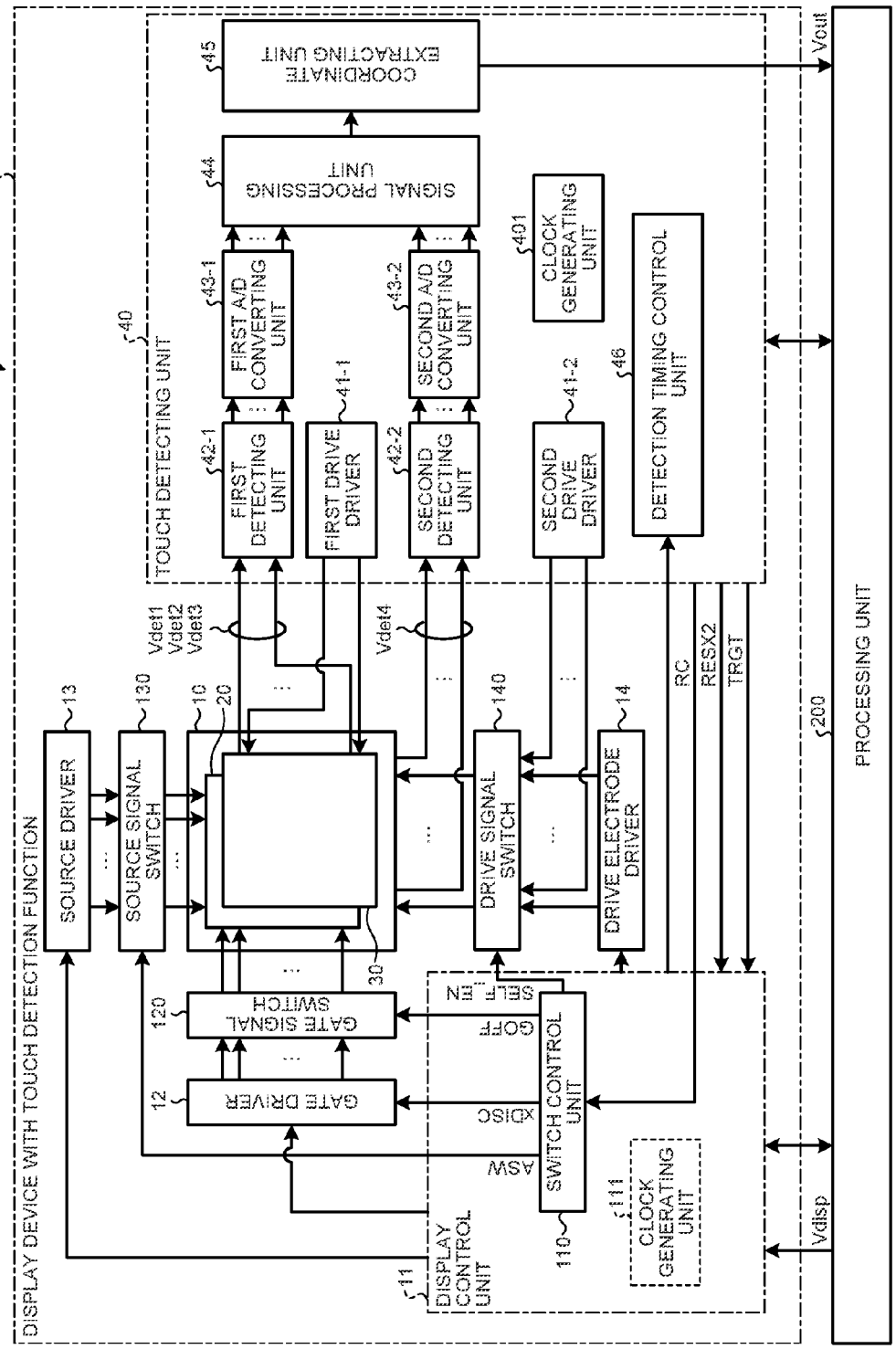
FIG. 1 is a block diagram of an exemplary configuration of a display device with a touch detection function and a display system according to a first embodiment.

Exemplary aspects (embodiments) to embody the present invention are described below in greater detail with reference to the accompanying drawings. The contents described in the embodiments are not intended to limit the present invention. Components described below include components easily conceivable by those skilled in the art and components substantially identical therewith. Furthermore, the components described below can be appropriately combined. The disclosure is given by way of example only, and various changes made without departing from the spirit of the invention and easily conceivable by those skilled in the art naturally fall within the scope of the invention. The drawings may possibly illustrate the width, the thickness, the shape, and other elements of each unit more schematically than the actual aspect to simplify the explanation. These elements, however, are given by way of example only and are not intended to limit interpretation of the invention. In the specification and the accompanying drawings, components similar to those previously described with reference to a preceding drawing are denoted by the same reference numerals and symbols, and overlapping explanation thereof will be appropriately omitted.

In this disclosure, when an element is described as being "on" another element, the element can be directly on the other element, or there can be one or more elements between the element and the other element.

First Embodiment

FIG. 1 is a block diagram of an exemplary configuration of a display device with a touch detection function and a display system according to a first embodiment. A display system 1 according to the present embodiment includes a display device 100 with a touch detection function and a processing unit 200.

The display device 100 with a touch detection function includes a display unit 10 with a touch detection function, a display control unit 11, a gate driver 12, a gate signal switch 120, a source driver 13, a source signal switch 130, a drive electrode driver 14, a drive signal switch 140, and a touch detecting unit 40. The display device 100 with a touch detection function is a display device including the display unit 10 having a touch detection function. The display unit 10 with a touch detection function according to the present embodiment is a device in which a display panel 20 is integrated with a touch panel 30. The display panel 20 includes liquid-crystal display elements serving as display elements. The touch panel 30 serves as a touch detecting device that detects touch input.

The display device 100 with a touch detection function has a normal operation mode and a sleep mode. In the normal operation mode, the display device 100 with a touch detection function performs an image display function to display an image on the display penal 20 and performs touch detection. In the sleep mode, the display device 100 with a touch detection function stops the image display function, that is, displays no image on the display panel 20 and performs touch detection. When no touch operation is performed for a certain period of time in the normal operation mode, the display device 100 with a touch detection function shifts to the sleep mode. When a predetermined gesture is detected in the sleep mode, the display device 100 with a touch detection function shifts to the normal operation mode. The predetermined gesture is a gesture that defines a trajectory pattern of movement of an external proximity object, such as a finger, on the touch panel 30. Examples of the gesture include a double tap, a swipe, etc. When the display device 100 with a touch detection function detects, in the sleep mode, a gesture to shift the mode of the display device 100 with a touch detection function from the sleep mode to the normal operation mode, the display device 100 with a touch detection function shifts to the normal operation mode in which an image is displayed.

In the normal operation mode, the display control unit 11, the gate driver 12, the source driver 13, the drive electrode driver 14, and the touch detecting unit 40 mainly operate in the display device 100 with a touch detection function. By contrast, in the sleep mode, a switch control unit 110 in the display control unit 11 and the touch detecting unit 40 mainly operate in the display device 100 with a touch detection function. The display system 1 according to the present embodiment includes the processing unit 200 and a backlight (not illustrated). The processing unit 200 is an application processor that executes an operating system program and the like to perform communications with the display control unit 11 and the touch detecting unit 40 and control the entire display system 1. The backlight emits light from the back surface of the display device 100 with a touch detection function.

In the normal operation mode, the display device 100 with a touch detection function detects a touch operation and coordinates at which the touch operation is performed, based on mutual capacitance between touch detection electrodes TDL (first electrodes) and drive electrodes COML (second electrodes), which will be described later. In the normal operation mode, the processing unit 200 detects a gesture based on the coordinates output from the display device 100 with a touch detection function and performs control corresponding to the gesture. When no touch operation is performed for a certain period of time or when a user intentionally performs an operation (e.g., an operation to turn off display) to shift the mode of the display device 100 with a touch detection function to the sleep mode in the normal operation mode, the processing unit 200 shifts the mode of the display device 100 with a touch detection function to the sleep mode.

In the sleep mode, the display device 100 with a touch detection function detects a touch operation by using self-capacitive touch detection technology with the touch detection electrodes TDL. If a touch operation is detected, the display device 100 with a touch detection function detects, by using self-capacitive touch detection technology with both the touch detection electrodes TDL and the drive electrodes COML, coordinates at which the touch operation is performed. When the touch operation is detected in the sleep mode, the processing unit 200 detects a predetermined gesture (gesture to shift the mode of the display device 100 with a touch detection function from the sleep mode to the normal operation mode) based on the coordinates output from the display device 100 with a touch detection function, thereby shifting the mode of the display device 100 with a touch detection function to the normal operation mode. In the normal operation mode of the present embodiment in which mutual-capacitive touch detection technology is used, the touch detection electrodes TDL are used only for detecting a touch operation and the coordinates at which the touch operation is performed, and the drive electrodes COML are used as drive electrodes for touch detection. The drive electrodes COML are also used as common electrodes for display driving. In contrast, in the sleep mode of the present embodiment, the self-capacitive touch detection technology with both the touch detection electrodes TDL and the drive electrodes COML is used to detect coordinates at which a touch operation is performed. In the sleep mode of the present embodiment, the touch detection electrodes TDL are driven, and then the coordinates of a touch detection position in the array direction of the touch detection electrodes TDL are obtained by detecting the degree of change in self-capacitance of the touch detection electrodes TDL. In the sleep mode of the present embodiment, the drive electrodes COML are also driven, and then the coordinates of a touch detection position in the array direction of the drive electrodes COML are obtained by detecting the degree of change in self-capacitance of the drive electrodes COML. The method of detecting touch coordinates in the sleep mode of the present embodiment will be described later in greater detail.

The gate driver 12 has a function to sequentially select one horizontal line to be a target of display driving in the display unit 10 with a touch detection function based on a control signal supplied from the display control unit 11 via the gate signal switch 120 in the normal operation mode.

The source driver 13 is a circuit that supplies pixel signals Vpix to sub-pixels SPix, which will be described later, of the display unit 10 with a touch detection function based on a control signal supplied from the display control unit 11 via the source signal switch 130 in the normal operation mode.

The drive electrode driver 14 is a circuit that supplies a drive signal Vcom to the drive electrodes COML, which will be described later, of the display unit 10 with a touch detection function based on a control signal supplied from the display control unit 11 via the drive signal switch 140 in the normal operation mode.

The display panel 20 is a display element that sequentially scans one horizontal line based on a scanning signal Vscan supplied from the gate driver 12, thereby performing display in the normal operation mode, which will be described later. The display control unit 11 is a circuit that supplies the control signals to the gate driver 12, the source driver 13, the drive electrode driver 14, and the touch detecting unit 40 based on video signals Vdisp supplied from the outside, thereby performing control such that these components operate in synchronization with one another.

The touch panel 30 operates based on the basic principle of capacitive touch detection and has a first touch detection mode in the normal operation mode, a second touch detection mode in the sleep mode, and a third touch detection mode in the sleep mode. In the first touch detection mode, based on the mutual capacitance between the drive electrodes COML and the touch detection electrodes TDL, which will be described later, the touch panel 30 detects a touch operation and/or coordinates at which the touch operation is performed. In the second touch detection mode, the touch panel 30 detects a touch operation based on the self-capacitance of the touch detection electrodes TDL. In the third touch detection mode, if a touch operation is detected in the second touch detection mode, the touch panel 30 detects, based on both the self-capacitance of the touch detection electrodes TDL and the self-capacitance of the drive electrodes COML, coordinates at which the touch operation is performed.

In the first touch detection mode, the touch panel 30 receives the drive signal Vcom from the drive electrode driver 14 via the drive signal switch 140 and outputs a first touch detection signal Vdet1 to a first detecting unit 42-1.

In the second touch detection mode, the touch panel 30 receives a drive signal from a first drive driver 41-1 of the touch detecting unit 40 and outputs a second touch detection signal Vdet2 to the first detecting unit 42-1.

In the third touch detection mode, the touch panel 30 receives a first drive signal from the first drive driver 41-1 of the touch detecting unit 40 and outputs a third touch detection signal Vdet3 to the first detecting unit 42-1. In addition, the touch panel 30 receives a second drive signal from a second drive driver 41-2 of the touch detecting unit 40 via the drive signal switch 140 and outputs a fourth touch detection signal Vdet4 to a second detecting unit 42-2.

The touch detecting unit 40 is a circuit that detects a touch operation and coordinates at which the touch operation is performed on the touch panel 30. The touch detecting unit 40 performs the touch operation based on the control signal supplied from the display control unit 11 and on the first touch detection signal Vdet1, the second touch detection signal Vdet2, the third touch detection signal Vdet3, and the fourth touch detection signal Vdet4 supplied from the touch panel 30.

When a touch operation is detected in the first touch detection mode in the normal operation mode, the touch detecting unit 40 calculates coordinates at which the touch operation is performed.

When a touch operation is detected in the second touch detection mode in the sleep mode, the touch detecting unit 40 shifts to the third touch detection mode to calculate coordinates at which the touch operation is performed.

The touch detecting unit 40 includes the first drive driver 41-1, the first detecting unit 42-1, a first analog/digital (A/D) converting unit 43-1, the second drive driver 41-2, the second detecting unit 42-2, a second A/D converting unit 43-2, a signal processing unit 44, a coordinate extracting unit 45, a detection timing control unit 46, and a clock generating unit 401. The touch detecting unit 40 has a function to transmit a reset signal RESX2 and a signal TRGT to the display control unit 11.

The display control unit 11 is a circuit that supplies the control signals to the gate driver 12, the source driver 13, the drive electrode driver 14, and the detection timing control unit 46 of the touch detecting unit 40 based on the video signals Vdisp supplied from the processing unit 200 in the normal operation mode. The display control unit 11 thus performs control such that these components operate in synchronization with one another.

The display control unit 11 includes a clock generating unit 111 that generates a reference clock. The display control unit 11 generates the control signals supplied to the gate driver 12, the source driver 13, the drive electrode driver 14, and the detection timing control unit 46 of the touch detecting unit 40 based on the reference clock generated by the clock generating unit 111 in the normal operation mode.

The display control unit 11 further includes the switch control unit 110 that controls the gate driver 12, the gate signal switch 120, the source signal switch 130, and the drive signal switch 140. Specifically, in the third touch detection mode in the sleep mode, the switch control unit 110 controls the gate driver 12 with a control signal xDISC, thereby causing the gate driver 12 not to operate. The switch control unit 110 also controls the gate signal switch 120 with a control signal GOFF, thereby making scanning signal lines GCL, which will be described later, into a floating state, that is, into a state of being cut off from the gate driver 12. In the third touch detection mode in the sleep mode, the switch control unit 110 also controls the source signal switch 130 with a control signal ASW, thereby making pixel signal lines SGL, which will be described later, into a floating state, that is, into a state of being cut off from the source driver 13. In the third touch detection mode in the sleep mode, the switch control unit 110 also controls the drive signal switch 140 with a control signal SELF_EN, thereby supplying the second drive signal transmitted from the second drive driver 41-2 of the touch detecting unit 40 to the touch panel 30. The reason why the scanning signal lines GCL and the pixel signal lines SGL are made into a floating state in the third touch detection mode in the sleep mode will be described later.

In the sleep mode, the clock generating unit 401 of the touch detecting unit 40 according to the present embodiment generates a reference clock required to control the detection timing control unit 46 of the touch detecting unit 40 and the switch control unit 110 of the display control unit 11. With this configuration, the display control unit 11 can stop operations of a functional block including the clock generating unit 111 other than a partial functional block including the switch control unit 110 in the sleep mode. It is thus possible to reduce the power consumption in the sleep mode.

In the configuration described above, the switch control unit 110 serves as a "floating-state control unit" that controls the floating state of the scanning signal lines GCL and the pixel signal lines SGL.

Figure 2:
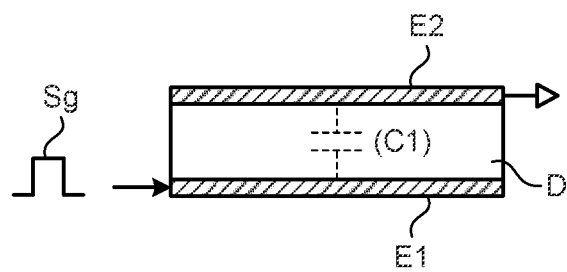
FIG. 2 is a diagram for explaining the basic principle of mutual-capacitive touch detection and illustrates a state where no finger is in contact with or in proximity to a device.
Figure 3:
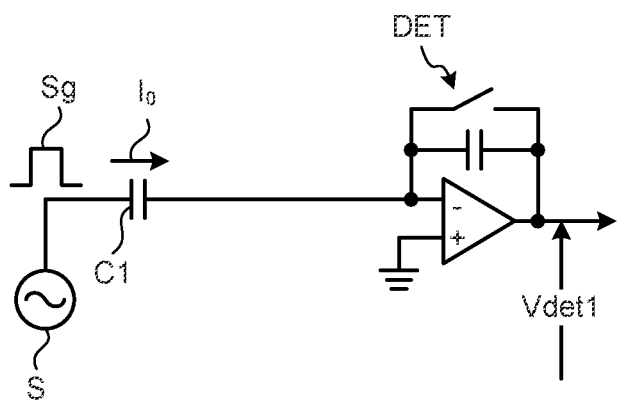
FIG. 3 is a diagram for explaining an example of an equivalent circuit in the state where no finger is in contact with or in proximity to the device as illustrated in FIG. 2.
Figure 4:
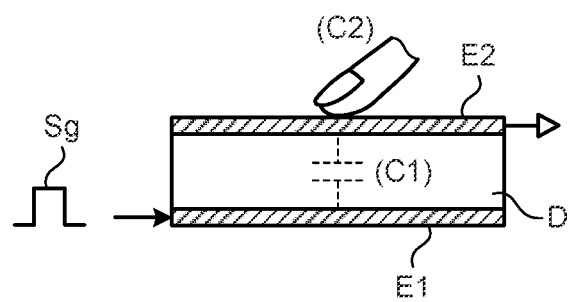
FIG. 4 is a diagram for explaining the basic principle of mutual-capacitive touch detection and illustrates a state where a finger is in contact with or in proximity to the device.
Figure 5:
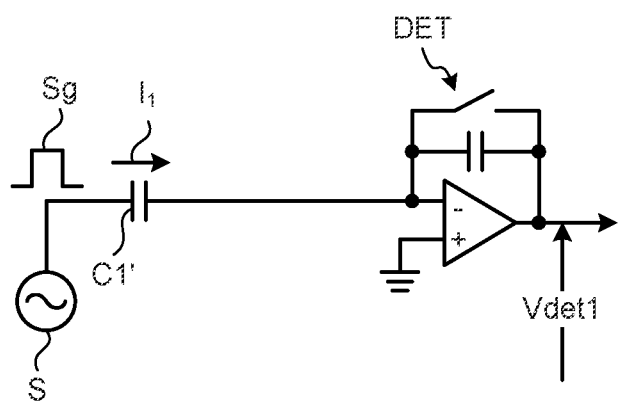
FIG. 5 is a diagram for explaining an example of the equivalent circuit in the state where a finger is in contact with or in proximity to the device as illustrated in FIG. 4.
Figure 6:
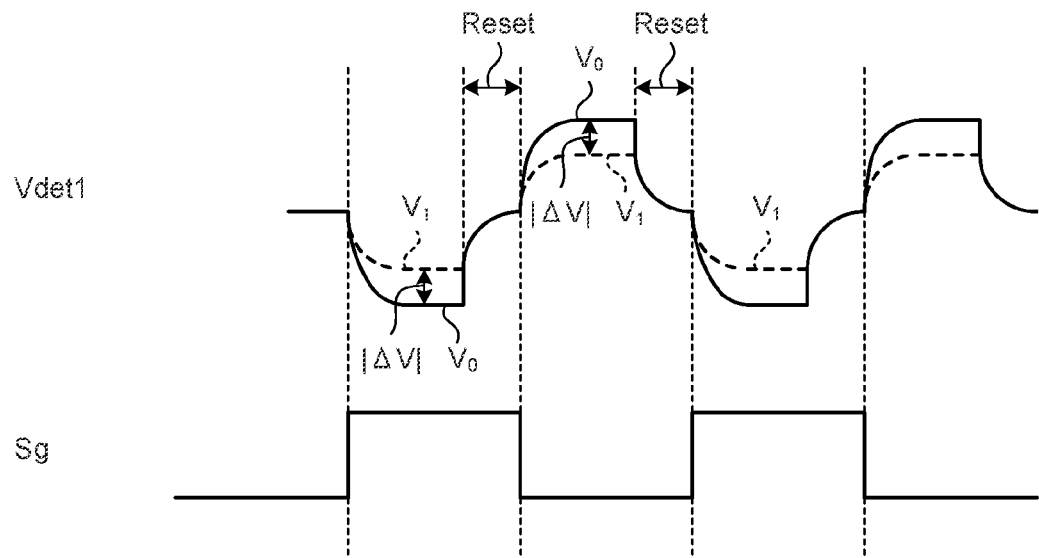
FIG. 6 is a diagram of an example of waveforms of a drive signal and a touch detection signal.

As described above, the touch panel 30 operates based on the basic principle of capacitive touch detection. The following describes the basic principle of mutual-capacitive touch detection in the first touch detection mode performed by the display device 100 with a touch detection function according to the present embodiment with reference to FIGS. 2 to 6. FIG. 2 is a diagram for explaining the basic principle of mutual-capacitive touch detection and illustrates a state where no finger is in contact with or in proximity to a device. FIG. 3 is a diagram for explaining an example of an equivalent circuit in the state where no finger is in contact with or in proximity to the device as illustrated in FIG. 2. FIG. 4 is a diagram for explaining the basic principle of mutual-capacitive touch detection and illustrates a state where a finger is in contact with or in proximity to the device. FIG. 5 is a diagram for explaining an example of the equivalent circuit in the state where a finger is in contact with or in proximity to the device as illustrated in FIG. 4. FIG. 6 is a diagram of an example of waveforms of a drive signal and a touch detection signal. While the following describes a case where a finger is in contact with or in proximity to the device, the external proximity object is not limited to a finger and may be an object, such as a stylus.

As illustrated in FIG. 2, for example, a capacitive element C1 includes a pair of electrodes of a drive electrode E1 and a touch detection electrode E2 arranged facing each other with a dielectric D interposed therebetween. As illustrated in FIG. 3, a first end of the capacitive element C1 is coupled with an alternating-current (AC) signal source (drive signal source) S, whereas a second end thereof is coupled with a voltage detector (touch detecting unit) DET. The voltage detector DET is an integration circuit included in the first detecting unit 42-1 illustrated in FIG. 1, for example.

When the AC signal source S applies an AC rectangular wave Sg at a predetermined frequency (e.g., approximately several kilohertz to several hundred kilohertz) to the drive electrode E1 (first end of the capacitive element C1), an output waveform (first touch detection signal Vdet1) illustrated in FIG. 6 is generated via the voltage detector DET coupled with the touch detection electrode E2 (second end of the capacitive element C1). The AC rectangular wave Sg corresponds to the drive signal Vcom transmitted from the drive electrode driver 14.

In a state where no finger is in contact with (or in proximity to) the device (non-contact state), an electric current $I_0$ depending on the capacitance value of the capacitive element C1 flows in association with charge and discharge of the capacitive element C1 as illustrated in FIGS. 2 and 3. The voltage detector DET illustrated in FIG. 3 converts change in the electric current $I_0$ depending on the AC rectangular wave Sg into change in the voltage (waveform $V_0$ indicated by the solid line (refer to FIG. 6)).

By contrast, in a state where a finger is in contact with (or in proximity to) the device (contact state), capacitance C2 generated by the finger is in contact with or in proximity to the touch detection electrode E2 as illustrated in FIG. 4, thereby blocking capacitance of a fringe between the drive electrode E1 and the touch detection electrode E2 and providing a capacitive element C1' having a capacitance value smaller than that of the capacitive element C1. As illustrated in the equivalent circuit in FIG. 5, an electric current $I_1$ flows through the capacitive element C1'. Subsequently, as illustrated in FIG. 6, the voltage detector DET converts change in the electric current $I_1$ depending on the AC rectangular wave Sg into change in the voltage (waveform $V_1$ indicated by the dotted line). In this case, the waveform $V_1$ has amplitude smaller than that of the waveform $V_0$. As a result, an absolute value $|\Delta V|$ of the voltage difference between the waveform $V_0$ and the waveform $V_1$ varies depending on an influence of an object, such as a finger, approaching the device from the outside. To accurately detect the absolute value $|\Delta V|$ of the voltage difference between the waveform $V_0$ and the waveform $V_1$, the voltage detector DET preferably operates while having a period Reset for resetting charge and discharge of a capacitor based on the frequency of the AC rectangular wave Sg by switching in the circuit.

In the first touch detection mode in the normal operation mode, the touch panel 30 illustrated in FIG. 1 sequentially scans each detection block in response to each drive signal Vcom supplied from the drive electrode driver 14 via the drive signal switch 140. In the first touch detection mode in the normal operation mode, the touch detecting unit 40 performs touch detection based on the mutual capacitance between the drive electrodes COML and the touch detection electrodes TDL, which will be described later.

In the first touch detection mode in the normal operation mode, the touch panel 30 outputs the first touch detection signals Vdet1 of the respective detection blocks from the touch detection electrodes TDL, which will be described later, via the voltage detector DET illustrated in FIG. 3 or 5. The first touch detection signals Vdet1 are supplied to the first detecting unit 42-1 of the touch detecting unit 40.

In the first touch detection mode in the normal operation mode, the first detecting unit 42-1 amplifies the first touch detection signals Vdet1 supplied from the touch panel 30. The first detecting unit 42-1 may include an analog low-pass filter (LPF) serving as a low-pass analog filter that removes high-frequency components (noise components) included in the first touch detection signals Vdet1 and outputs the remaining components.

In the first touch detection mode in the normal operation mode, the first A/D converting unit 43-1 samples each analog signal output from the first detecting unit 42-1 at a timing synchronized with each drive signal Vcom, thereby converting each analog signal into a digital signal.

Figure 7:
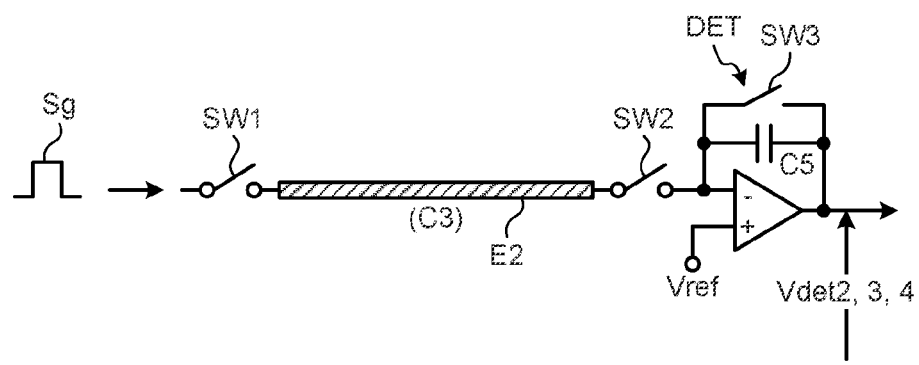
FIG. 7 is a diagram for explaining the basic principle of self-capacitive touch detection and illustrates an example of the equivalent circuit in a state where no finger is in contact with or in proximity to a device.
Figure 8:
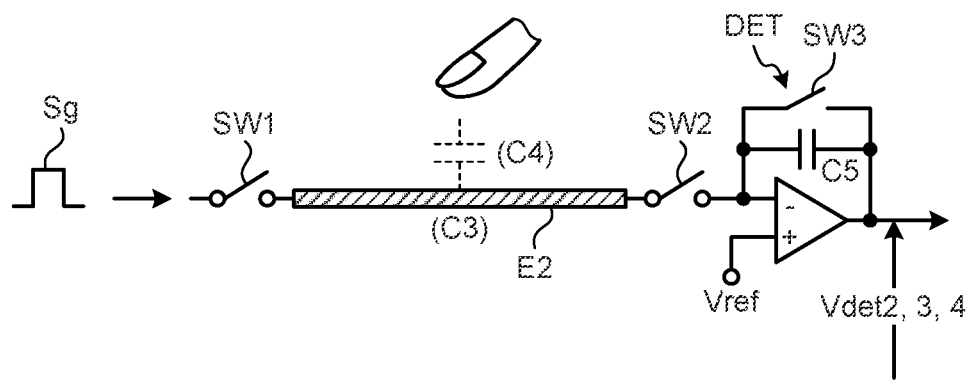
FIG. 8 is a diagram for explaining the basic principle of self-capacitive touch detection and illustrates an example of the equivalent circuit in a state where a finger is in contact with or in proximity to the device.
Figure 9:
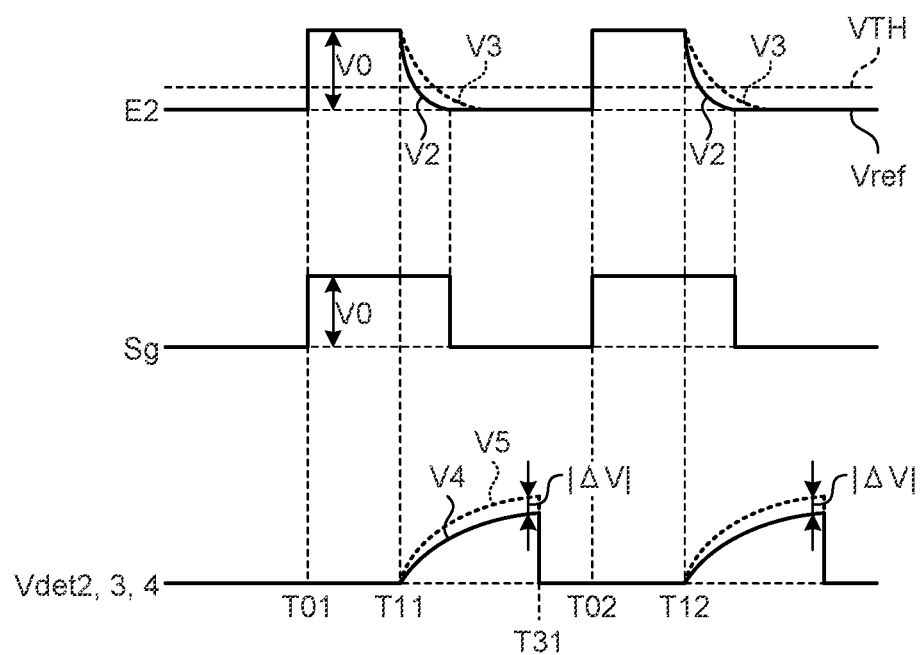
FIG. 9 is a diagram of an example of waveforms of the drive signal and the touch detection signal.

The following describes the basic principle of self-capacitive touch detection in the second touch detection mode and the third touch detection mode performed by the display device 100 with a touch detection function according to the present embodiment with reference to FIGS. 7 to 9. FIG. 7 is a diagram for explaining the basic principle of self-capacitive touch detection and illustrates an example of the equivalent circuit in a state where no finger is in contact with or in proximity to a device. FIG. 8 is a diagram for explaining the basic principle of self-capacitive touch detection and illustrates an example of the equivalent circuit in a state where a finger is in contact with or in proximity to the device. FIG. 9 is a diagram of an example of waveforms of the drive signal and the touch detection signal. While the following describes a case where a finger is in contact with or in proximity to the device, the external proximity object is not limited to a finger and may be an object, such as a stylus.

As illustrated in FIG. 7, when no finger is in contact with or in proximity to the device, the AC rectangular wave Sg at a predetermined frequency (e.g., approximately several kilohertz to several hundred kilohertz) is applied to the touch detection electrode E2. Because the touch detection electrode E2 has capacitance C3, an electric current depending on the capacitance C3 flows. The voltage detector DET converts change in the electric current depending on the AC rectangular wave Sg into change in the voltage (waveform V2 indicated by the solid line (refer to FIG. 9)).

Specifically, as illustrated in FIGS. 7 and 8, the touch detection electrode E2 can be cut off by a switch SW1 and a switch SW2. As illustrated in FIG. 9, the AC waveform Sg raises the voltage level by an amount corresponding to voltage V0 at a timing of time T01. At this time, the switch SW1 is turned on, and the switch SW2 is turned off. As a result, the voltage level in the touch detection electrode E2 is also raised by the voltage V0. Subsequently, the switch SW1 is turned off before a timing of time T11. At this time, the touch detection electrode E2 is made into a floating state, and the electric potential of the touch detection electrode E2 is maintained at V0 by the capacitance C3 (refer to FIG. 7) of the touch detection electrode or capacitance (C3+C4, refer to FIG. 8) obtained by adding capacitance C4 to the capacitance C3 of the touch detection electrode, the capacitance C4 generated by the finger or the like in contact with or in proximity to the device. Subsequently, a switch SW3 is turned on before the timing of time T11 and is turned off after a predetermined time has elapsed, thereby resetting the voltage detector DET. With this reset operation, the output voltage is made substantially equal to Vref.

Subsequently, the switch SW2 is turned on at the timing of time T11, and therefore the voltage in an inverting input unit of the voltage detector DET is increased to the voltage V0 equal to that of the touch detection electrode E2. Subsequently, the voltage in the inverting input unit of the voltage detector DET is reduced to reference voltage Vref based on the time constant of the capacitance C3 (or C3+C4) of the touch detection electrode E2 and capacitance C5 in the voltage detector DET. Because the electric charge accumulated in the capacitance C3 (or C3+C4) of the touch detection electrode E2 moves to the capacitance C5 in the voltage detector DET, output (the second touch detection signal Vdet2, the third touch detection signal Vdet3, and the fourth touch detection signal Vdet4) from the voltage detector DET is increased. When no finger is in proximity to the touch detection electrode E2, the output (Vdet2 to Vdet4) from the voltage detector DET is represented by a waveform V4 indicated by the solid line, and Vdet2=C3·V0/C5, Vdet3=C3·V0/C5, and Vdet4=C3·V0/C5 are satisfied. When capacitance caused by a finger or the like is added, the output is represented by a waveform V5 indicated by the solid line, and Vdet2=(C3+C4) V0/C5, Vdet3=(C3+C4)·V0/C5, and Vdet4=(C3+C4)·V0/C5 are satisfied. Subsequently, at a timing of time T31 after the electric charge in the capacitance C3 (or C3+C4) of the touch detection electrode sufficiently moves to the capacitance C5, the switch SW2 is turned off, and the switch SW1 and the switch SW3 are turned on. The electric potential of the touch detection electrode E2 is reduced to a low level equal to that of the AC waveform Sg, and the voltage detector DET is reset. The switch SW1 and SW3 may be turned on at any timing after the turning off of the switch SW2 and before time T02. The voltage detector DET may be reset at any timing after the turning off of the switch SW2 and before time T12. The operation described above is repeatedly performed at a predetermined frequency (e.g., approximately several kilohertz to several hundred kilohertz). As illustrated in FIG. 9, when no finger or the like is in proximity to the device, the electric potential of the touch detection electrode E2 is indicated by the waveform V2. By contrast, when the capacitance C4 caused by a finger or the like is added, the electric potential is indicated by a waveform V3. Whether an external proximity object is present (whether a touch is made) may be determined by measuring a time required for the waveforms V2 and V3 to decrease to predetermined voltage VTH.

In the second touch detection mode in the sleep mode, the touch detection electrodes TDL in the touch panel 30 illustrated in FIG. 1, which will be described later, are supplied with electric charges based on each drive signal transmitted from the first drive driver 41-1. In the second touch detection mode in the sleep mode, the touch detecting unit 40 detects a touch on the touch panel 30 based on the self-capacitance of the touch detection electrodes TDL.

In the second touch detection mode in the sleep mode, the touch panel 30 outputs the second touch detection signals Vdet2 from the touch detection electrodes TDL, which will be described later, via the voltage detector DET illustrated in FIG. 7 or 8. The second touch detection signals Vdet2 are supplied to the first detecting unit 42-1 of the touch detecting unit 40.

In the second touch detection mode in the sleep mode, the first detecting unit 42-1 amplifies the second touch detection signals Vdet2 supplied from the touch panel 30.

In the second touch detection mode in the sleep mode, the first A/D converting unit 43-1 performs A/D conversion on the signals received from the first detecting unit 42-1 and outputs them to the signal processing unit 44.

By contrast, in the third touch detection mode in the sleep mode, the touch detection electrodes TDL in the touch panel 30 illustrated in FIG. 1, which will be described later, are supplied with electric charges based on each first drive signal transmitted from the first drive driver 41-1 to the touch detection electrodes TDL. In the third touch detection mode in the sleep mode, the drive electrodes COML, which will be described later, are also supplied with electric charges based on each second drive signal transmitted from the second drive driver 41-2 via the drive signal switch 140 to the drive electrodes COML. In the third touch detection mode in the sleep mode, the touch detecting unit 40 detects a touch on the touch panel 30 based on both the self-capacitance of the touch detection electrodes TDL and the self-capacitance of the drive electrodes COML.

In the third touch detection mode in the sleep mode, the touch panel 30 outputs the third touch detection signals Vdet3 from the touch detection electrodes TDL, which will be described later, via the voltage detector DET illustrated in FIG. 7 or 8. The touch panel 30 also outputs the fourth touch detection signals Vdet4 from the drive electrodes COML, which will be described later, via the voltage detector DET illustrated in FIG. 7 or 8. The third touch detection signals Vdet3 are supplied to the first detecting unit 42-1 of the touch detecting unit 40. The fourth touch detection signals Vdet4 are supplied to the second detecting unit 42-2 of the touch detecting unit 40.

In the third touch detection mode in the sleep mode, the first detecting unit 42-1 amplifies the third touch detection signals Vdet3 supplied from the touch panel 30. The second detecting unit 42-2 amplifies the fourth touch detection signals Vdet4 supplied from the touch panel 30. The first detecting unit 42-1 may include an analog LPF serving as a low-pass analog filter that removes high-frequency components (noise components) included in the second touch detection signals Vdet2 and the third touch detection signals Vdet3 and outputs the remaining components. The second detecting unit 42-2 may include an analog LPF serving as a low-pass analog filter that removes high-frequency components (noise components) included in the fourth touch detection signals Vdet4 and outputs the remaining components.

In the third touch detection mode in the sleep mode, the first A/D converting unit 43-1 performs A/D conversion on the signals received from the first detecting unit 42-1 and outputs them to the signal processing unit 44. The second A/D converting unit 43-2 performs A/D conversion on the signals received from the second detecting unit 42-2 and outputs them to the signal processing unit 44.

The signal processing unit 44 is a logic circuit that detects whether a touch is made on the touch panel 30 based on the output signals from the first A/D converting unit 43-1 and the second A/D converting unit 43-2.

In the first touch detection mode in the normal operation mode, the signal processing unit 44 performs processing for extracting only the difference between the detection signals caused by the finger. The differential signal caused by the finger corresponds to the absolute value $|\Delta V|$ of the difference between the waveform $V_0$ and the waveform $V_1$ illustrated in FIG. 6. The signal processing unit 44 may perform an arithmetic operation for averaging the absolute value $|\Delta V|$ per detection block, thereby calculating the average of the absolute value $|\Delta V|$. By performing the operation, the signal processing unit 44 can reduce an influence caused by noise. The signal processing unit 44 compares the detected differential signal caused by the finger with a predetermined threshold voltage. If the differential signal is lower than the threshold voltage, the signal processing unit 44 determines that an external proximity object is in the non-contact state or in the non-proximity state. By contrast, if the signal processing unit 44 compares the detected digital voltage with the predetermined threshold voltage, and the digital voltage is equal to or higher than the threshold voltage, the signal processing unit 44 determines that an external proximity object is in the contact state or in the proximity state. As described above, the touch detecting unit 40 can perform mutual-capacitive touch detection in the first touch detection mode in the normal operation mode.

In the second touch detection mode and the third touch detection mode in the sleep mode, the signal processing unit 44 performs processing for extracting only the differential voltage caused by the finger. The signal processing unit 44 compares the detected differential voltage caused by the finger with a predetermined threshold voltage. If the differential voltage is equal to or higher than the threshold voltage, the signal processing unit 44 determines that an external proximity object approaching from the outside is in the contact state or in the proximity state. By contrast, if the differential voltage is lower than the threshold voltage, the signal processing unit 44 determines that an external proximity object is in the non-contact state or in the non-proximity state. As described above, the touch detecting unit 40 can perform self-capacitive touch detection in the second touch detection mode and the third touch detection mode in the sleep mode.

The coordinate extracting unit 45 is a logic circuit that determines, when a touch is detected by the signal processing unit 44, the touch panel coordinates of the touch. The coordinate extracting unit 45 outputs the touch panel coordinates as detection signal output Vout.

In the first touch detection mode in the normal operation mode of the present embodiment, detection of a touch on the touch panel 30 is performed based on the mutual capacitance between the drive electrodes COML and the touch detection electrodes TDL, which will be described later, making it possible to determine the touch panel coordinates. The typical self-capacitive detection technology employed in the second touch detection mode in the sleep mode, however, can detect coordinates in the array direction of the touch detection electrodes TDL but fail to detect coordinates in the array direction of the drive electrodes COML orthogonal to that of the touch detection electrodes TDL because the technology detects the coordinates by detecting the degree of change in self-capacitance only of the touch detection electrodes TDL. To address this, in the present embodiment, a touch operation is detected based on the self-capacitance of the touch detection electrodes TDL first in the second touch detection mode in the sleep mode. If a touch operation is detected in the second touch detection mode, the coordinates in the array direction of the touch detection electrodes TDL and the coordinates in the array direction of the drive electrodes COML are determined based on both the self-capacitance of the touch detection electrodes TDL and the self-capacitance of the drive electrodes COML in the third touch detection mode. With this configuration, touch coordinates and/or a gesture can be detected in the sleep mode without performing the mutual-capacitive touch detection between the drive electrodes COML and the touch detection electrodes TDL that requires timing control performed by the display control unit 11.

Figure 10:
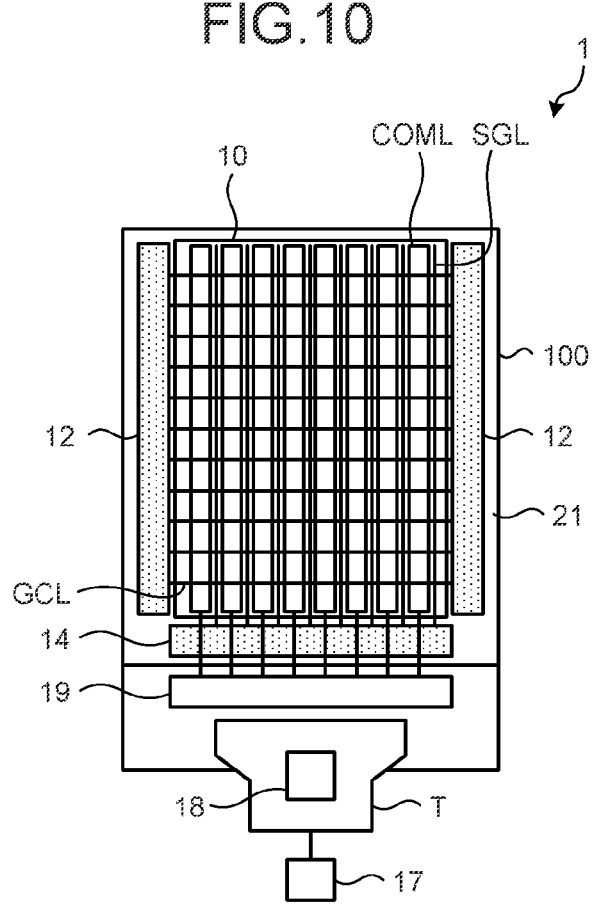
FIG. 10 is a schematic view of an example of a module on which the display device with a touch detection function according to the first embodiment is mounted.

FIG. 10 is a schematic view of an example of a module on which the display device with a touch detection function according to the first embodiment is mounted. As illustrated in FIG. 10, the display device 100 with a touch detection function according to the first embodiment includes the display unit 10 with a touch detection function, the gate driver 12, the drive electrode driver 14, a display control integrated circuit (IC) (first IC) 19, and a touch detection IC (second IC) 18. The display unit 10 with a touch detection function, the gate driver 12, and the drive electrode driver 14 are provided on a TFT substrate 21 that is a glass substrate. The display system 1 according to the first embodiment includes the display device 100 with a touch detection function and a host IC 17.

The display control IC 19 is a chip mounted on the TFT substrate 21 by the chip-on-glass (COG) technology and includes the display control unit 11.

The touch detection IC 18 is mounted on a flexible substrate T provided to a short side of the TFT substrate 21 and includes the touch detecting unit 40.

The host IC 17 is provided outside the display device 100 with a touch detection function and is coupled therewith via the flexible substrate T. The host IC 17 includes the processing unit 200.

While the gate signal switch 120, the source driver 13, the source signal switch 130, the drive signal switch 140, and other components illustrated in FIG. 1 are not illustrated in the example in FIG. 10, they are provided on the TFT substrate 21 together with the display unit 10 with a touch detection function, the gate driver 12, and the drive electrode driver 14.

The example in FIG. 10 schematically illustrates the drive electrodes COML and the scanning signal lines GCL viewed in the vertical direction with respect to the surface of the TFT substrate 21, the scanning signal lines GCL being coupled with the gate driver 12 and arranged intersecting with the drive electrodes COML on the display unit 10 with a touch detection function in a grade separated manner. The example in FIG. 10 also schematically illustrates the drive electrodes COML and the pixel signal lines SGL extending in a direction parallel to the drive electrodes COML without intersecting therewith viewed in the vertical direction with respect to the surface of the TFT substrate 21.

The display unit 10 with a touch detection function is a display unit that has a touch detection function. In the example illustrated in FIG. 10, the drive electrodes COML extend in the longitudinal direction of the display unit 10 with a touch detection function. The touch detection electrodes TDL, which will be described later, extend in a direction orthogonal to the derive electrodes COML.

Figure 11:
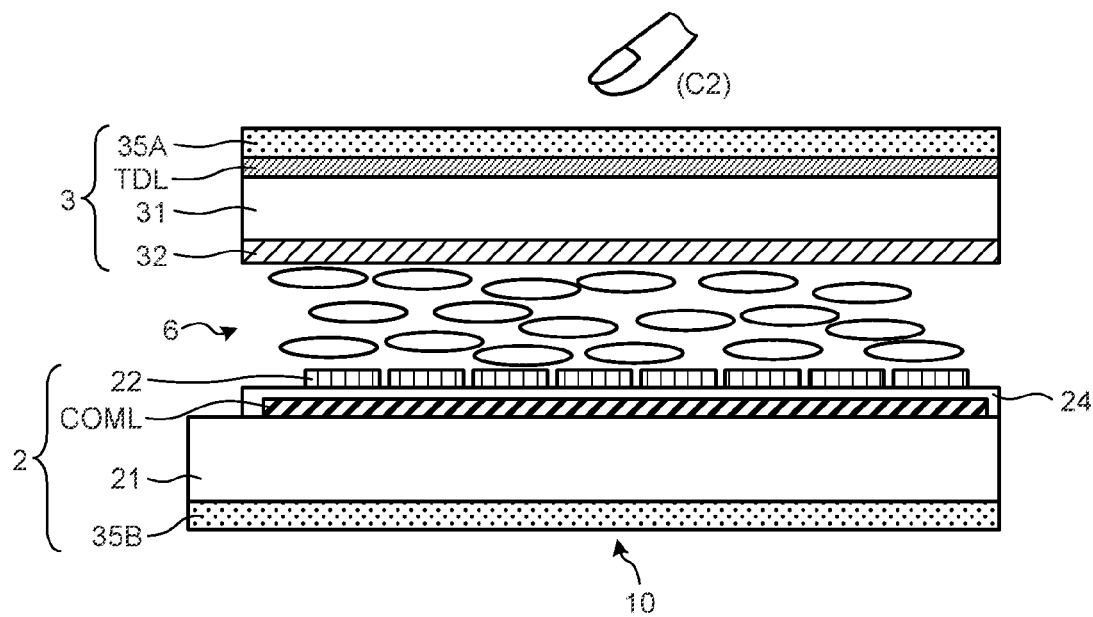
FIG. 11 is a sectional view of a schematic structure of a display unit with a touch detection function according to the first embodiment.
Figure 12:
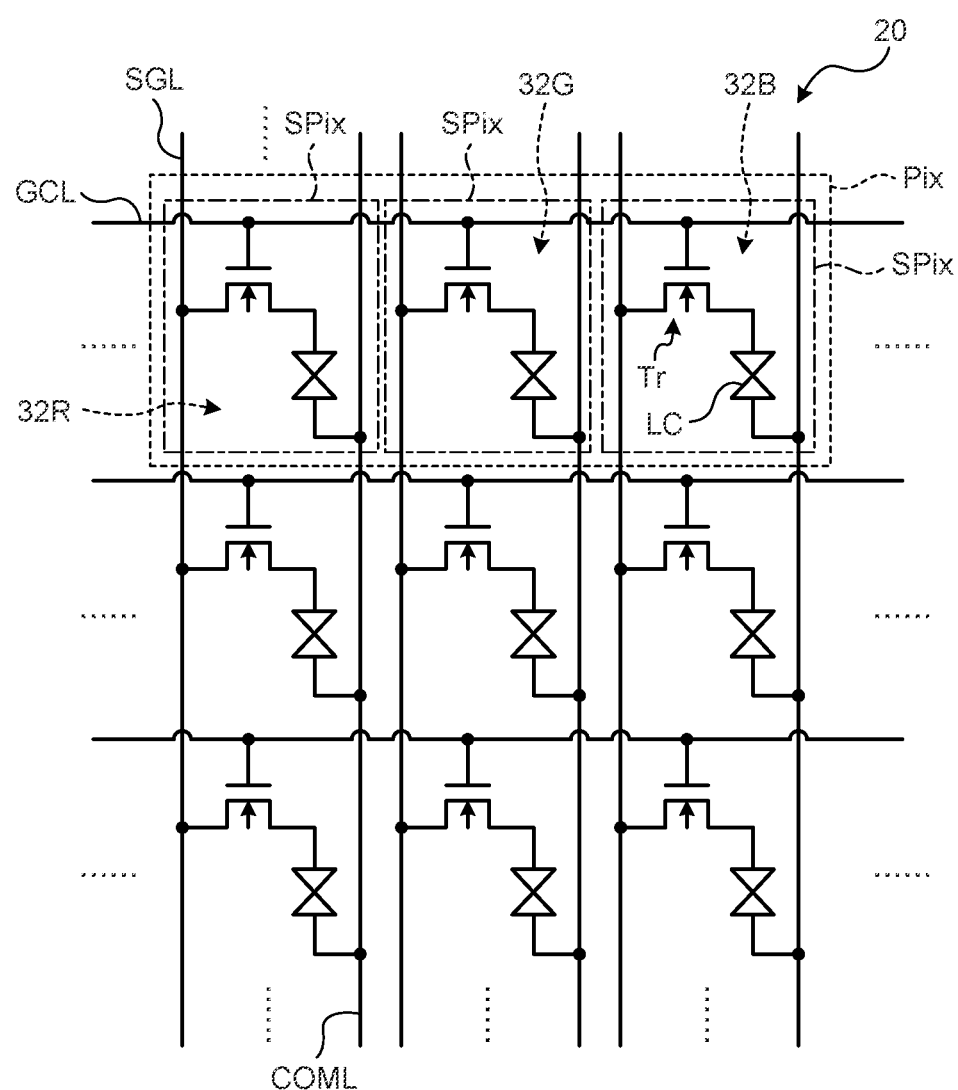
FIG. 12 is a circuit diagram of a pixel array in the display unit with a touch detection function according to the first embodiment.

The following describes an exemplary configuration of the display unit 10 with a touch detection function in greater detail. FIG. 11 is a sectional view of a schematic structure of the display unit with a touch detection function according to the first embodiment. FIG. 12 is a circuit diagram of a pixel array in the display unit with a touch detection function according to the first embodiment.

As illustrated in FIG. 11, the display unit 10 with a touch detection function includes a pixel substrate 2, a counter substrate 3, and a liquid-crystal layer 6. The counter substrate 3 is arranged facing the surface of the pixel substrate 2 in a perpendicular direction. The liquid-crystal layer 6 is interposed between the pixel substrate 2 and the counter substrate 3.

The liquid-crystal layer 6 modulates light passing therethrough depending on the state of an electric field. The liquid-crystal layer 6, for example, is a liquid-crystal display unit including liquid crystals in a lateral electric-field mode, such as the in-plane switching (IPS) mode including the fringe field switching (FFS) mode. An orientation film may be provided between the liquid-crystal layer 6 and the pixel substrate 2 and between the liquid-crystal layer 6 and the counter substrate 3 illustrated in FIG. 9.

The counter substrate 3 includes a glass substrate 31 and a color filter 32 provided on one surface of the glass substrate 31. The touch detection electrodes TDL serving as the detection electrodes of the touch panel 30 are provided on the other surface of the glass substrate 31. A polarization plate 35A is provided on the touch detection electrodes TDL.

The pixel substrate 2 includes the TFT substrate 21, a plurality of pixel electrodes 22, the drive electrodes COML, an insulation layer 24, and an incident-side polarization plate 35B. The TFT substrate 21 serves as a circuit board. The pixel electrodes 22 are arranged in a matrix on the TFT substrate 21. The drive electrodes COML are provided between the TFT substrate 21 and the pixel electrodes 22. The insulation layer 24 provides electrical insulation between the pixel electrodes 22 and the drive electrodes COML. The incident-side polarization plate 35B is provided on the lower surface of the TFT substrate 21.

The TFT substrate 21 is provided with thin-film transistor (TFT) elements Tr of respective sub-pixels SPix constituting a pixel Pix and with wirings, such as the pixel signal lines SGL and the scanning signal lines GCL, as illustrated in FIG. 12. The pixel signal lines SGL supply the pixel signals Vpix to the respective pixel electrodes 22, and the scanning signal lines GCL drive the TFT elements Tr. The pixel signal lines SGL extend on a plane parallel to the surface of the TFT substrate 21 and supply the pixel signals Vpix used to display an image on the pixels. The display panel 20 illustrated in FIG. 12 includes a plurality of sub-pixels SPix arranged in a matrix. The sub-pixels SPix each include the TFT element Tr and a liquid-crystal element LC. The TFT element Tr is a thin-film transistor and is an n-channel metal oxide semiconductor (MOS) TFT in this example. The source of the TFT element Tr is coupled with the pixel signal line SGL, the gate thereof is coupled with the scanning signal line GCL, and the drain thereof is coupled with a first end of the liquid-crystal element LC. The first end of the liquid-crystal element LC is coupled with the drain of the TFT element Tr, and a second end thereof is coupled with the drive electrode COML.

The sub-pixel SPix is coupled with other sub-pixels SPix belonging to the same row in the display panel 20 by the scanning signal line GCL. The scanning signal line GCL is coupled with the gate driver 12 via the gate signal switch 120 and is supplied with the scanning signal Vscan from the gate driver 12. The sub-pixel SPix is coupled with other sub-pixels SPix belonging to the same column in the display panel 20 by the pixel signal line SGL. The pixel signal line SGL is coupled with the source driver 13 via the source signal switch 130 and is supplied with the pixel signal Vpix from the source driver 13. The sub-pixel SPix is also coupled with the other sub-pixels SPix belonging to the same column in the display panel 20 by the drive electrode COML. The drive electrode COML is coupled with the drive electrode driver 14 via the drive signal switch 140 and is supplied with the drive signal Vcom from the drive electrode driver 14. In other words, one drive electrode COML is shared by a plurality of sub-pixels SPix belonging to the same column in this example.

The gate driver 12 illustrated in FIG. 1 applies the scanning signal Vscan to the gates of the TFT elements Tr of the sub-pixels SPix via the scanning signal line GCL illustrated in FIG. 12. As a result, the gate driver 12 sequentially selects one row (one horizontal line) out of the sub-pixels SPix arranged in a matrix in the display panel 20 as a target of display driving. The source driver 13 illustrated in FIG. 1 supplies the pixel signals Vpix to the sub-pixels SPix constituting one horizontal line sequentially selected by the gate driver 12 via the pixel signal lines SGL illustrated in FIG. 12. These sub-pixels SPix perform display of one horizontal line based on the supplied pixel signals Vpix. The drive electrode driver 14 illustrated in FIG. 1 applies the drive signal Vcom to each drive electrode COML in each drive electrode block including a predetermined number of drive electrodes COML illustrated in FIGS. 11 and 12, thereby driving the drive electrodes COML in each drive electrode block.

As described above, the gate driver 12 sequentially drives the scanning signal lines GCL in the display panel 20 in a time-division manner, i.e., so as to scan, one after another, one scanning line GCL at a time, thereby sequentially selecting one horizontal line. The source driver 13 supplies the pixel signal Vpix to each sub-pixel SPix belonging to the selected one horizontal line in the display panel 20, thereby performing display of each horizontal line. To perform the display operation, the drive electrode driver 14 applies the drive signal Vcom to the drive electrode block including drive electrodes COML corresponding to the selected horizontal line.

To display an image in the normal operation mode, the drive electrodes COML according to the present embodiment serve as common electrodes that supply a common potential to a plurality of pixels constituting a display area in which the image is displayed. The drive electrodes COML also serve as drive electrodes to perform mutual-capacitive touch detection in the first touch detection mode in the normal operation mode. The drive electrodes COML according to the present embodiment also serve as detection electrodes to perform self-capacitive touch detection in the third touch detection mode in the sleep mode.

Figure 13:
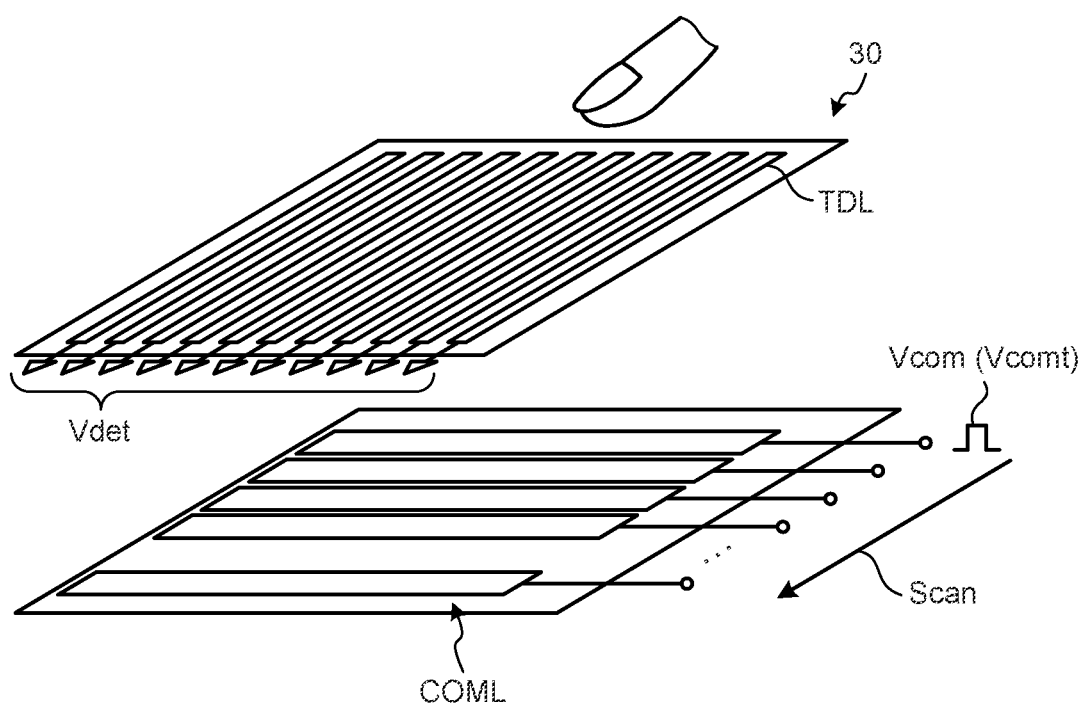
FIG. 13 is a perspective view of a positional relation between drive electrodes and touch detection electrodes.

FIG. 13 is a perspective view of the positional relation between the drive electrodes and the touch detection electrodes. The drive electrodes COML are stripe electrode patterns extending in one direction. To perform a mutual-capacitive touch detection operation in the first touch detection mode in the normal operation mode, the drive electrode driver 14 sequentially supplies the drive signal Vcom to the electrode patterns via the drive signal switch 140, thereby performing sequential linear scanning drive in a time-division manner, which will be described later. The touch detection electrodes TDL are stripe electrode patterns extending in a direction orthogonal to the extending direction of the electrode patterns of the drive electrodes COML. The touch detection electrodes TDL face the drive electrodes COML in a direction substantially perpendicular to the surface of the TFT substrate 21. The electrode patterns of the drive electrodes COML and the electrode patterns of the touch detection electrodes TDL intersect with each other and generate capacitance at the intersection portions.

With this configuration, to perform a touch detection operation based on the mutual capacitance in the first touch detection mode in the normal operation mode, the drive electrode driver 14 sequentially drives the drive electrode blocks in a time-division manner, thereby sequentially selecting one detection block of the drive electrodes COML. Subsequently, the touch detection electrodes TDL each output the first touch detection signal Vdet1, thereby performing touch detection for the selected one detection block. In other words, the drive electrode block in the first touch detection mode in the normal operation mode corresponds to the drive electrode E1 in the basic principle of the mutual-capacitive touch detection, whereas the touch detection electrodes TDL correspond to the touch detection electrode E2. The touch panel 30 detects a touch operation and touch coordinates at which the touch operation is performed according to the basic principle. As illustrated in FIG. 13, the electrode patterns intersecting with each other serve as a capacitive touch sensor formed in a matrix. By scanning the entire touch detection surface of the touch panel 30, it is possible to detect the position at which an external proximity object is in contact with or in proximity to the touch panel 30 in the first touch detection mode in the normal operation mode.

To perform a touch detection operation based on the self-capacitance of the touch detection electrodes TDL in the second touch detection mode in the sleep mode, the first drive driver 41-1 supplies the drive signal to each of the touch detection electrodes TDL. The touch detection electrodes TDL each output the second touch detection signal Vdet2. When the user brings the finger or the like into contact with or closer to the touch panel 30, capacitance is generated between the finger or the like and the touch detection electrodes TDL, thereby changing the capacitance of the touch detection electrodes TDL. It is thus possible to detect the contact or the proximity of the external proximity object with or to the touch panel 30 in the second touch detection mode in the sleep mode. In the second touch detection mode in the sleep mode, the touch detection electrodes TDL correspond to the touch detection electrode E2 in the basic principle of the self-capacitive touch detection. In the second touch detection mode in the sleep mode, the touch panel 30 detects a touch operation according to the basic principle.

To perform a touch detection operation based on both the self-capacitance of the touch detection electrodes TDL and the self-capacitance of the drive electrodes COML in the third touch detection mode in the sleep mode, the first drive driver 41-1 supplies the first drive signal to each of the touch detection electrodes TDL. The touch detection electrodes TDL each output the third touch detection signal Vdet3. The second drive driver 41-2 supplies the second drive signal to each of the drive electrodes COML via the drive signal switch 140. The drive electrodes COML each output the fourth touch detection signal Vdet4. When the user brings the finger or the like into contact with or closer to the touch panel 30, capacitance is generated between the finger or the like and the touch detection electrodes TDL, thereby changing the capacitance of the touch detection electrodes TDL. In addition, capacitance is generated between the finger or the like and the drive electrodes COML, thereby changing the capacitance of the drive electrodes COML. It is thus possible to detect coordinates at which the external proximity object is in contact with or in proximity to the touch panel 30 in the third touch detection mode in the sleep mode. In the third touch detection mode in the sleep mode, the touch detection electrodes TDL and the drive electrodes COML correspond to the touch detection electrode E2 in the basic principle of the self-capacitive touch detection. In the third touch detection mode in the sleep mode, the touch panel 30 detects coordinates at which a touch operation is performed according to the basic principle.

As described above, to display an image in the normal operation mode, the drive electrodes COML in the display unit 10 with a touch detection function according to the present embodiment serve as common electrodes that supply a common potential to a plurality of pixels constituting a display area in which the image is displayed. The drive electrodes COML also serve as drive electrodes to perform mutual-capacitive touch detection in the first touch detection mode in the normal operation mode. The drive electrodes COML according to the present embodiment also serve as detection electrodes to perform self-capacitive touch detection in the third touch detection mode in the sleep mode. The display unit 10 with a touch detection function according to the present embodiment includes the pixel substrate 2 and the counter substrate 3 arranged facing each other with the liquid-crystal layer 6 interposed therebetween as illustrated in FIG. 11. The pixel substrate 2 includes the TFT substrate 21 provided with the drive electrodes COML, the pixel signal lines SGL, and the scanning signal lines GCL. The counter substrate 3 is provided with the touch detection electrodes TDL. With this configuration, the capacitance between the drive electrodes COML and the pixel signal lines SGL and the capacitance between the drive electrodes COML and the scanning signal lines GCL are too large to be ignored compared with the capacitance generated between the finger or the like and the drive electrodes COML in the third touch detection mode in the sleep mode. If the electric potential of the pixel signal lines SGL and the scanning signal lines GCL are fixed, this configuration may possibly reduce the accuracy of detection in a touch detection operation performed based on the self-capacitance of the drive electrodes COML in the third touch detection mode in the sleep mode.

As described above, the scanning signal lines GCL and the pixel signal lines SGL are brought into a floating state in the third touch detection mode in the sleep mode. This configuration can suppress reduction in the detection accuracy caused by capacitive coupling between the drive electrodes COML and the pixel signal lines SGL and between the drive electrodes COML and the scanning signal lines GCL.

If the drive signal is continuously supplied to the drive electrodes COML with the scanning signal lines GCL and the pixel signal lines SGL made into the floating state, the following situation may possibly occur: unexpected application of voltage to the scanning signal lines GCL and the pixel signal lines SGL causes burn-in on the display panel 20, thereby causing display abnormality, such as bright black display, on the screen.

In the present embodiment, the floating state of the scanning signal lines GCL and the pixel signal lines SGL is canceled temporarily (e.g., periodically) in the third touch detection mode in the sleep mode. This configuration can suppress burn-in on the display panel 20.

As illustrated in FIG. 1, the touch detecting unit 40 according to the present embodiment outputs, to the switch control unit 110, a control signal for canceling the floating state of the scanning signal lines GCL and the pixel signal lines SGL. The touch detecting unit 40 controls the timing of canceling the floating state of the scanning signal lines GCL and the pixel signal lines SGL based on the reference clock generated by the clock generating unit 111. This configuration can maintain the stop state of the clock generating unit 111 of the display control unit 11, thereby reducing the power consumption in the sleep mode.

Figure 14:
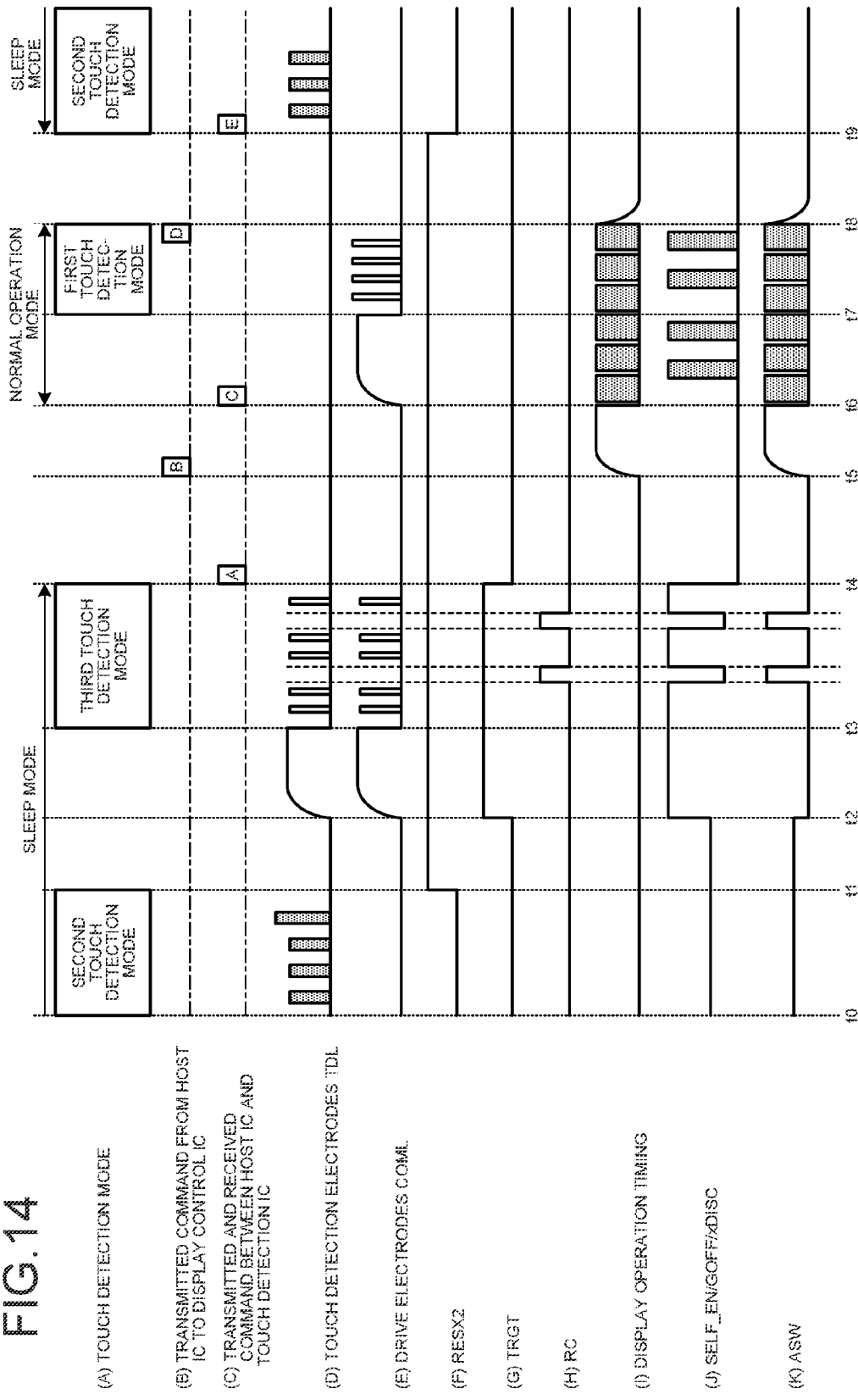
FIG. 14 is an exemplary timing chart of operations performed by the display system according to the first embodiment.
Figure 15:
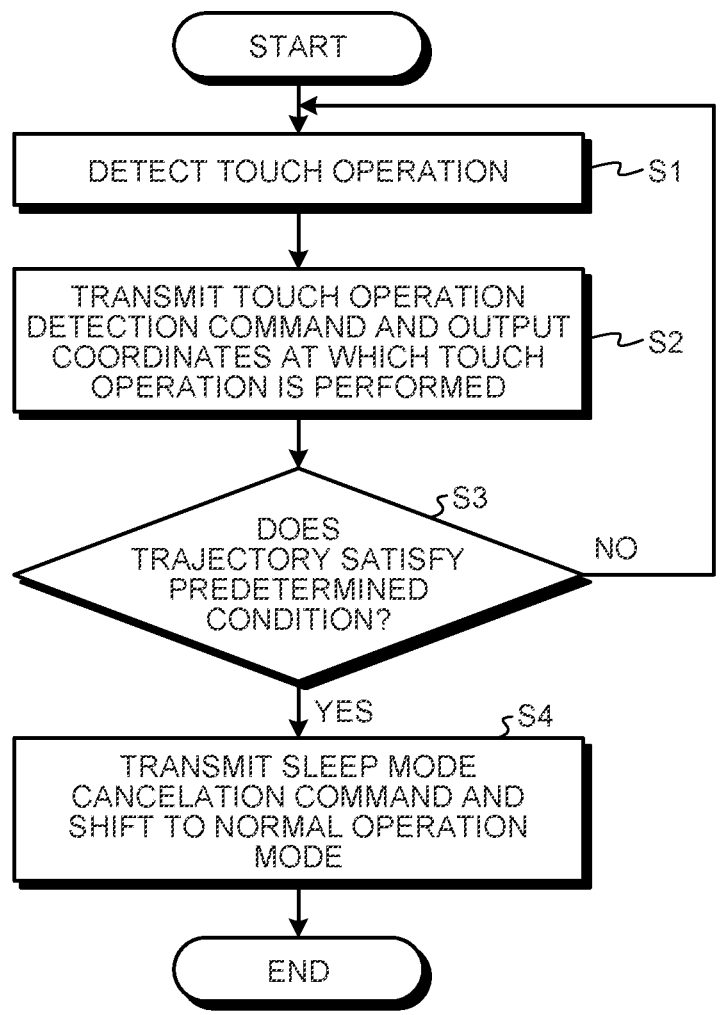
FIG. 15 is an exemplary flowchart of a gesture determination flow performed by the display system according to the first embodiment.

The following describes operations performed by the display system 1 according to the present embodiment in greater detail. FIG. 14 is an exemplary timing chart of the operations performed by the display system according to the first embodiment. FIG. 15 is an exemplary flowchart of a gesture determination flow performed by the display system according to the first embodiment. In the example illustrated in FIGS. 14 and 15, the display control unit 11 is mounted on the display control IC 19, and the touch detecting unit 40 is mounted on the touch detection IC 18 as described with reference to FIG. 10. The processing unit 200 is mounted on the external host IC 17.

In the example illustrated in FIG. 14, Row (A) indicates touch detection modes of the touch detection IC 18. Row (B) indicates commands transmitted from the host IC 17 to the display control IC 19, and Row (C) indicates commands transmitted and received between the host IC 17 and the touch detection IC 18. Row (D) indicates the drive signal supplied to the touch detection electrodes TDL, and Row (E) indicates the drive signal supplied to the drive electrodes COML. Row (F) indicates the signal RESX2 serving as a hardware reset signal output from the touch detection IC 18 to start a partial function including the switch control unit 110 mounted on the display control IC 19. Row (G) indicates the signal TRGT serving as a control signal output from the touch detection IC 18 to the display control IC 19. Row (H) indicates a signal RC (floating-state cancellation signal) output from the touch detection IC 18 to the switch control unit 110 of the display control unit 11. Row (I) indicates the display operation timing in the display control IC. Row (J) indicates the operation timing of the signals SELF_EN, GOFF, and xDISC output from the switch control unit 110 of the display control unit 11. Row (K) indicates the operation timing of the signal ASW output from the switch control unit 110 of the display control unit 11.

At an initial timing t0, the touch detection IC 18 is performing an operation of the second touch detection mode (Row (A) in FIG. 14) based on the self-capacitance of the touch detection electrodes TDL (Row (D) in FIG. 14). In the second touch detection mode, the touch detection IC 18 detects a touch operation performed in the sleep mode (Step S1 in FIG. 15). Specifically, in a touch detection period (from the timing t0 to a timing t1) in which the touch detection IC 18 is operating in the second touch detection mode, the first drive driver 41-1 outputs the drive signal to the touch detection electrodes TDL at predetermined intervals. The first detecting unit 42-1 detects change in the voltage of the touch detection electrodes TDL (change in the voltage of the second touch detection signals Vdet2 received by the first detecting unit 42-1). Based on the change in the voltage of the second touch detection signals Vdet2, the touch detection IC 18 detects a touch operation. At this time, the display control IC 19 stops operations in portions other than a functional block that receives an external signal, such as the signal RESX2. The signals RESX2, TRGT, and RC output from the touch detection IC 18 are inactive (at a low level) (Row (F), Row (G), and Row (H) in FIG. 14).

If the touch detection IC 18 detects a touch operation in the second touch detection mode based on the self-capacitance of the touch detection electrodes TDL (Row (D) in FIG. 14), the touch detection IC 18 makes the signal RESX2 active (at a high level) (Row (F) in FIG. 14) at the timing t1. The signal RESX2 is transmitted from the touch detection IC 18 to the display control IC 19. If the signal RESX2 is made active at the timing t1, the display control IC 19 starts a partial function including the switch control unit 110.

At a timing t2, the touch detection IC 18 makes the signal TRGT active (at a high level) (Row (G) in FIG. 14) and starts the first drive driver 41-1 and the second drive driver 41-2. The signal TRGT is transmitted from the touch detection IC 18 to the display control IC 19. If the signal TRGT is made active at the timing t1, the switch control unit 110 of the display control IC 19 controls the gate driver 12 and the gate signal switch 120 to make the scanning signal lines GCL into a floating state. The switch control unit 110 also controls the source signal switch 130 to make the pixel signal lines SGL into a floating state. The switch control unit 110 also controls the drive signal switch 140 to couple the output from the second drive driver 41-2 with the drive electrodes COML. In the example illustrated in FIG. 14, the switch control unit 110 makes the signal xDISC for controlling the gate driver 12, the signal GOFF for controlling the gate signal switch 120, and the signal SELF_EN for controlling the drive signal switch 140 active (at a high level) (Row (J) in FIG. 14). The switch control unit 110 makes the signal ASW for controlling the source signal switch 130 inactive (at a low level) (Row (K) in FIG. 14).

At a timing t3, the touch detection IC 18 starts an operation of the third touch detection mode (Row (A) in FIG. 14). The touch detection IC 18 uses both the self-capacitance of the touch detection electrodes TDL and the self-capacitance of the drive electrodes COML at predetermined intervals (Row (D) and Row (E) in FIG. 14) to perform the operation of the third touch detection mode. In the third touch detection mode, the touch detection IC 18 detects coordinates at which the touch operation is performed in the sleep mode. Specifically, in a touch detection period (from the timing t3 to a timing t4) in which the touch detection IC 18 is operating in the third touch detection mode, the first drive driver 41-1 outputs the first drive signal to the touch detection electrodes TDL at predetermined intervals. The first detecting unit 42-1 detects change in the voltage of the touch detection electrodes TDL (change in the voltage of the third touch detection signals Vdet3 received by the first detecting unit 42-1). The second drive driver 42-1 outputs the second drive signal to the drive electrodes COML at predetermined intervals. The second detecting unit 42-2 detects change in the voltage of the drive electrodes COML (change in the voltage of the fourth touch detection signals Vdet4 received by the second detecting unit 42-2). Based on the change in the voltage of the third touch detection signals Vdet3 and the change in the voltage of the fourth touch detection signals Vdet4, the touch detection IC 18 detects the coordinates at which the touch operation is performed. In the touch detection period in the third touch detection mode, the switch control unit 110 temporarily cancels the floating state of the scanning signal lines GCL and the pixel signal lines SGL. In other words, in the touch detection period in the third touch detection mode, the switch control unit 110 makes the scanning signal lines GCL and the pixel signal lines SGL into the floating state intermittently. In the example illustrated in FIG. 14, the touch detection IC 18 temporarily makes the signal RC (floating-state cancellation signal) active (at a high level) (Row (H) in FIG. 14), the signal RC being a signal output to the switch control unit 110 of the display control IC 19. This operation inverts the logic of the signals xDISC, GOFF, SELF_EN, and ASW output from the switch control unit 110, thereby temporarily canceling the floating state of the scanning signal lines GCL and the pixel signal lines SGL. The floating state of the scanning signal lines GCL and the pixel signal lines SGL is preferably canceled at regular intervals in synchronization with one frame period in the normal operation mode (e.g., 60 Hz (one period=16.7 ms)), for example. The floating state of the scanning signal lines GCL and the pixel signal lines SGL is periodically canceled in this manner, whereby they are made into the floating state intermittently.

At the timing t4, the touch detection IC 18 transmits, to the host IC 17, a command A indicating that a touch operation is detected (Row (C) in FIG. 14) and outputs the coordinates at which the touch operation is performed as the detection signal output Vout (Step S2 in FIG. 15).

The host IC 17 stores therein a gesture that defines a trajectory pattern on the touch panel 30 to shift the mode of the display device 100 with a touch detection function from the sleep mode to the normal operation mode. The host IC 17 compares the trajectory of the coordinates detected by the touch detection IC 18 with the trajectory pattern (Step S3 in FIG. 15). If the trajectory satisfies a predetermined condition defined as the trajectory pattern (Yes at Step S3 in FIG. 15), the host IC 17 transmits a cancellation command B for canceling the sleep mode to the display control IC 19 at a timing t5 (Row (B) in FIG. 14 and Step S4 in FIG. 15). If the display control IC 19 receives the cancellation command B for canceling the sleep mode, the display control IC 19 starts a functional block required for an operation in the normal operation mode and shifts the mode of the display device 100 with a touch detection function to the normal operation mode (Row (I) in FIG. 14 and Step S4 in FIG. 15). If the trajectory of the coordinates detected by the touch detection IC 18 does not satisfies the predetermined condition defined as the trajectory pattern (No at Step S3 in FIG. 15), the display system 1 performs the processing at Step S1 in FIG. 15 again to shift to the second touch detection mode. The display system 1 then repeatedly performs the processing from Step S1 to Step S3. The above described condition of Step 3, in which the detected trajectory satisfies a predetermined condition defined as the trajectory pattern, may be a condition such that the detected trajectory and a predetermined pattern have a predetermined similarity relation. For example, it may be determined that the detected trajectory satisfies the predetermined condition defined as the trajectory pattern when the detected trajectory and the predetermined pattern are exactly the same (identical), i.e., the degree of difference thereof is 0%. It may be determined that the detected trajectory satisfies the predetermined condition defined as the trajectory pattern when the detected trajectory and the predetermined pattern are substantially the same (similar). It may be determined that the detected trajectory satisfies the predetermined condition defined as the trajectory pattern when the degree of similarity of the detected trajectory and the predetermined pattern is equal to or higher than a predetermined threshold. It may be determined that the detected trajectory satisfies the predetermined condition defined as the trajectory pattern when the degree deference of the detected trajectory and the predetermined pattern is lower than a predetermined threshold.

At a timing t6, the host IC 17 transmits, to the touch detection IC 18, a shift command C for shifting the mode of the display device 100 with a touch detection function to the first touch detection mode in the normal operation mode (Row (C) in FIG. 14).

At a timing t7, the touch detection IC 18 starts an operation of the first touch detection mode in the normal operation mode (Row (A) in FIG. 14). In the first touch detection mode, the touch detection IC 18 detects, based on the mutual capacitance between the drive electrodes COML and the touch detection electrodes TDL, a touch operation and coordinates at which the touch operation is performed. Specifically, in a touch detection period (from the timing t7 to a timing t8) in which the touch detection IC 18 is operating in the first touch detection mode, the drive electrode driver 14 outputs the drive signal Vcom to the drive electrodes COML at predetermined intervals. The first detecting unit 42-1 detects change in the voltage of the touch detection electrodes TDL (change in the voltage of the first touch detection signals Vdet1 received by the first detecting unit 42-1). Based on the change in the voltage of the first touch detection signals Vdet1, the touch detection IC 18 detects a touch operation and coordinates at which the touch operation is performed. In the normal operation mode, the host IC 17 detects a gesture based on the coordinates detected in the first touch detection mode and performs control corresponding to the gesture. If no touch operation is performed for a certain period of time or if the user intentionally performs an operation (e.g., an operation to turn off display) to shift the mode of the display device 100 with a touch detection function to the sleep mode in the normal operation mode, the host IC 17 shifts the mode of the display device 100 with a touch detection function to the sleep mode.

In the example illustrated in FIG. 14, the host IC 17 transmits a shift command D for shifting the mode of the display device 100 with a touch detection function to the sleep mode to the display control IC 19 at the timing t8 (Row (B) in FIG. 14). The display control IC 19 stops the display operation in the normal mode.

At a timing t9, the host IC 17 transmits, to the touch detection IC 18, a shift command E for shifting the mode of the display device 100 with a touch detection function to the second touch detection mode in the sleep mode. The touch detection IC 18 starts detection of a touch operation in the second touch detection mode based on the self-capacitance of the touch detection electrodes TDL and makes the signal RESX2 inactive (at a low level) (Row (F) in FIG. 14). If the signal RESX2 is made inactive at the timing t9, the display control IC 19 stops operations in portions other than the functional block that receives an external signal, such as the signal RESX2.

As described above, the display device 100 with a touch detection function and the display system 1 according to the first embodiment include the display panel 20 and the touch panel 30 integrated with each other. The display device 100 with a touch detection function and the display system 1 include the touch detection electrodes (first electrodes) TDL, the drive electrodes (second electrodes) COML, and the pixel signal lines SGL and the scanning signal lines GCL.

The touch detection electrodes TDL are provided on the touch panel 30, and the drive electrodes COML are provided on the display panel 20. The pixel signal lines SGL and the scanning signal lines GCL are provided on the display panel 20 together with the drive electrodes COML in a manner interesting with each other in planar view. The display device 100 with a touch detection function and the display system 1 have a third touch detection mode in the sleep mode for performing touch detection while stopping image display. In the third touch detection mode, both the self-capacitance of the touch detection electrodes TDL and the self-capacitance of the drive electrodes COML are used to perform touch detection. In the third touch detection mode, the display device 100 with a touch detection function and the display system 1 apply the first drive signal to the touch detection electrodes (first electrodes) TDL and the second drive signal to the drive electrodes (second electrodes) COML at predetermined intervals. Based on change in the voltage of the touch detection electrodes (first electrodes) TDL and change in the voltage of the drive electrodes (second electrodes) COML, the display device 100 with a touch detection function and the display system 1 detect coordinates at which a touch operation is performed. With this configuration, the display device 100 with a touch detection function and the display system 1 can detect touch coordinates and/or a gesture without performing the mutual-capacitive touch detection that requires timing control performed by the display control unit 11.

In the sleep mode, the clock generating unit 401 of the touch detecting unit 40 generates a reference clock required to control the detection timing control unit 46 of the touch detecting unit 40 and the switch control unit 110 of the display control unit 11. With this configuration, the display control unit 11 can stop operations of a functional block including the clock generating unit 111 other than a partial functional block including the switch control unit 110 in the sleep mode. It is thus possible to reduce the power consumption in the sleep mode.

The display device 100 with a touch detection function and the display system 1 make the pixel signal lines SGL and the scanning signal lines GCL into a floating state in the touch detection period in the third touch detection mode. With this configuration, the display device 100 with a touch detection function and the display system 1 can suppress reduction in the detection accuracy caused by capacitive coupling between the drive electrodes COML and the pixel signal lines SGL and between the drive electrodes COML and the scanning signal lines GCL.

The display device 100 with a touch detection function and the display system 1 temporarily (periodically) cancel the floating state of the pixel signal lines SGL and the scanning signal lines GCL in the touch detection period in the third touch detection mode. With this configuration, the display device 100 with a touch detection function and the display system 1 can suppress burn-in on the display panel 20 caused by unexpected application of voltage to the scanning signal lines GCL and the pixel signal lines SGL. It is thus possible to prevent display abnormality, such as bright black display, on the screen in the sleep mode.

The present embodiment can provide the display device 100 with a touch detection function and the display system 1 that provide low power consumption when performing the gesture detection function in the sleep mode as a configuration including a display panel with a touch detection function obtained by integrating a display panel with a touch panel.

Second Embodiment

Figure 16:
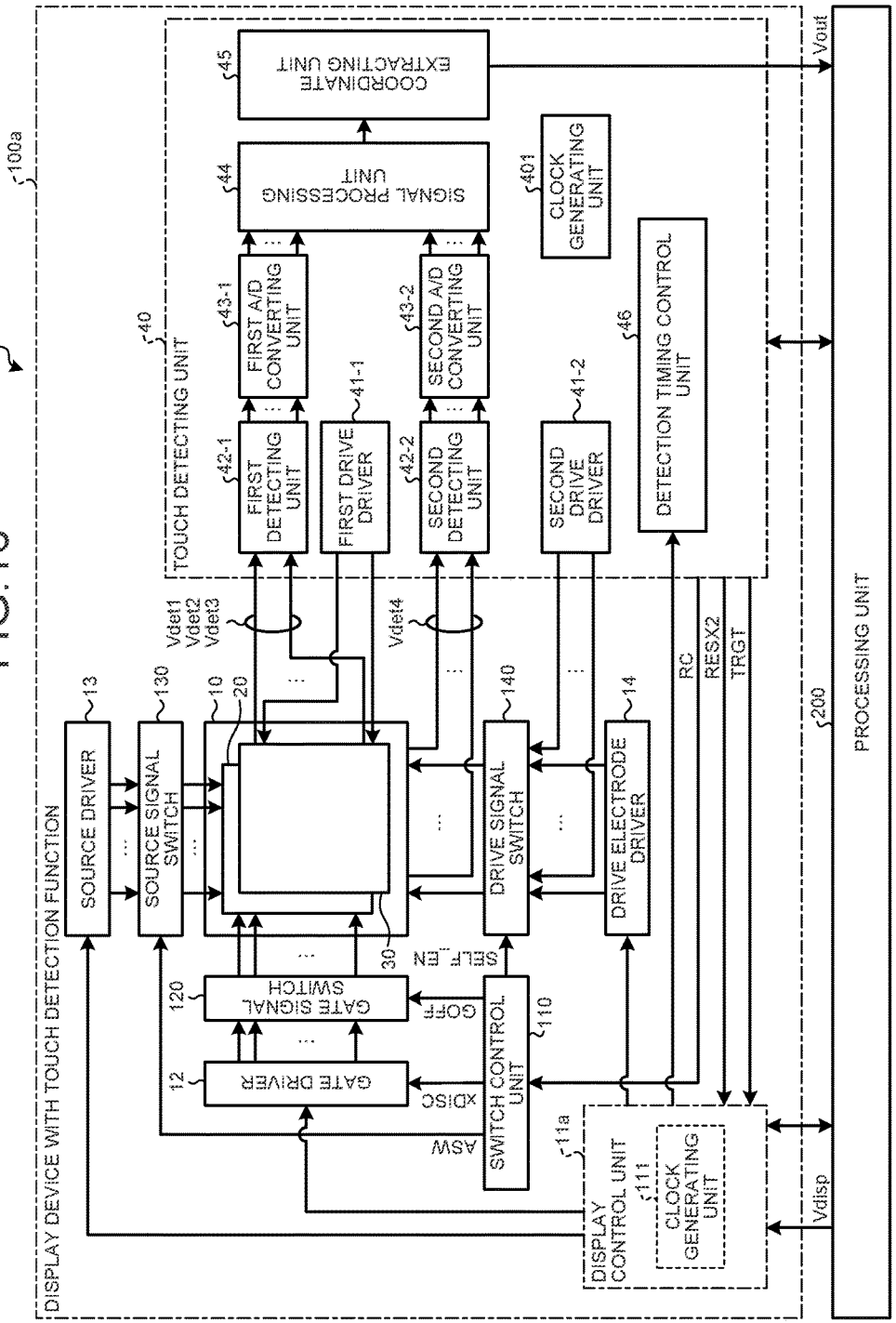
FIG. 16 is a block diagram of an exemplary configuration of a display device with a touch detection function and a display system according to a second embodiment.
Figure 17:
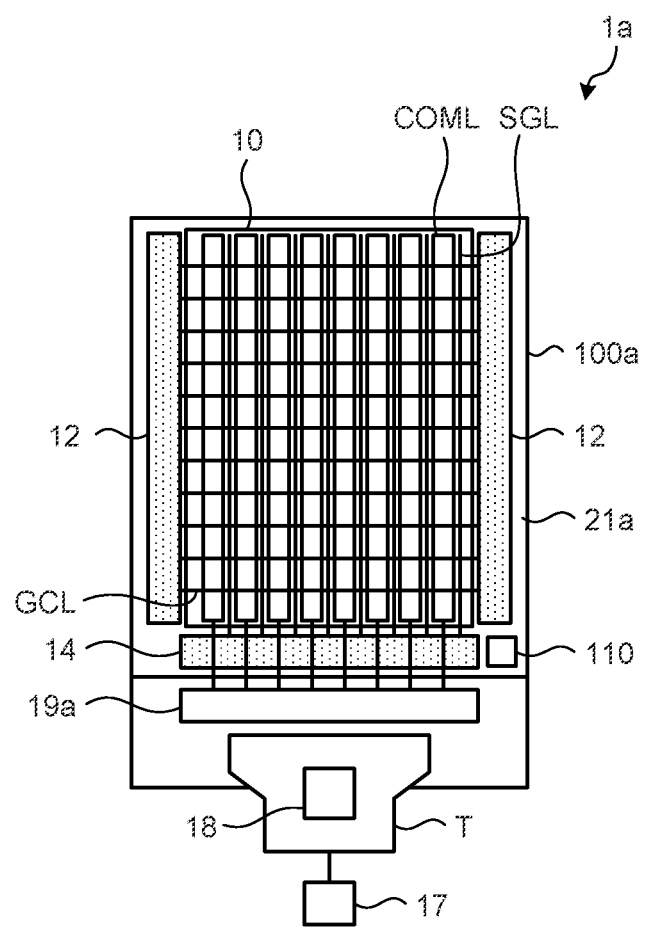
FIG. 17 is a schematic view of an example of a module on which the display device with a touch detection function according to the second embodiment is mounted.

FIG. 16 is a block diagram of an exemplary configuration of a display device with a touch detection function and a display system according to a second embodiment. FIG. 17 is a schematic view of an example of a module on which the display device with a touch detection function according to the second embodiment is mounted. Components identical with those described in the embodiment above are denoted by the same reference numerals and symbols, and overlapping explanation thereof will be omitted.

As illustrated in FIG. 16, a display control unit 11a in a display device 100a with a touch detection function and a display system 1a according to the present embodiment does not include a switch control unit (floating-state control unit) 110.

As illustrated in FIG. 17, the display device 100a with a touch detection function according to the second embodiment includes the display unit 10 with a touch detection function, the gate driver 12, the drive electrode driver 14, a display control IC (first IC) 19a, and the touch detection IC (second IC) 18. The display unit 10 with a touch detection function, the gate driver 12, and the drive electrode driver 14 are provided on a TFT substrate 21a that is a glass substrate. The display system 1a according to the second embodiment includes the display device 100a with a touch detection function and the host IC 17.

The display control IC 19a is a chip mounted on the TFT substrate 21a by the COG technology and includes the display control unit 11a.

The switch control unit 110 according to the present embodiment is not included in the display control IC 19a and is provided on the TFT substrate 21a together with the display unit 10 with a touch detection function, the gate driver 12, and the drive electrode driver 14 as illustrated in FIG. 17. The switch control unit 110 may be provided on a chip mounted on the TFT substrate 21a by the COG technology or provided directly on the TFT substrate 21a as a thin-film transistor, for example.

The touch detection IC 18 is mounted on the flexible substrate T provided to a short side of the TFT substrate 21a and includes the touch detecting unit 40.

The host IC 17 is provided outside the display device 100a with a touch detection function and is coupled therewith via the flexible substrate T. The host IC 17 includes the processing unit 200.

In the display device 100a with a touch detection function according to the second embodiment illustrated in FIGS. 16 and 17, the signal RC (floating-state cancellation signal) output from the touch detecting unit 40 (that is, the touch detection IC 18) is received by the switch control unit 110 provided on the TFT substrate 21a.

The present embodiment having this configuration can also provide the same advantageous effects as those of the first embodiment by performing the same operation as that in the first embodiment. Specifically, similarly to the first embodiment, the pixel signal lines SGL and the scanning signal lines GCL are made into a floating state intermittently in the touch detection period in the third touch detection mode. As a result, the display device 100a with a touch detection function and the display system 1a according to the present embodiment can suppress reduction in the detection accuracy caused by capacitive coupling between the drive electrodes COML and the pixel signal lines SGL and between the drive electrodes COML and the scanning signal lines GCL. In addition, the display device 100a with a touch detection function and the display system 1a according to the present embodiment can suppress burn-in on the display panel 20 caused by unexpected application of voltage to the scanning signal lines GCL and the pixel signal lines SGL. It is thus possible to prevent display abnormality, such as bright black display, on the screen in the sleep mode. Similarly to the first embodiment, in the sleep mode of the present embodiment, the clock generating unit 401 of the touch detecting unit 40 generates a reference clock required to control the detection timing control unit 46 of the touch detecting unit 40 and the switch control unit 110 of the display control unit 11. This configuration stops operations of a functional block including the clock generating unit 111 other than a partial functional block including the switch control unit 110 of the display control unit 11 in the sleep mode. It is thus possible to reduce the power consumption in the sleep mode.

The present embodiment can provide the display device 100a with a touch detection function and the display system 1a that provide low power consumption when performing the gesture detection function in the sleep mode as a configuration including a display panel with a touch detection function obtained by integrating a display panel with a touch panel.

Third Embodiment

Figure 18:
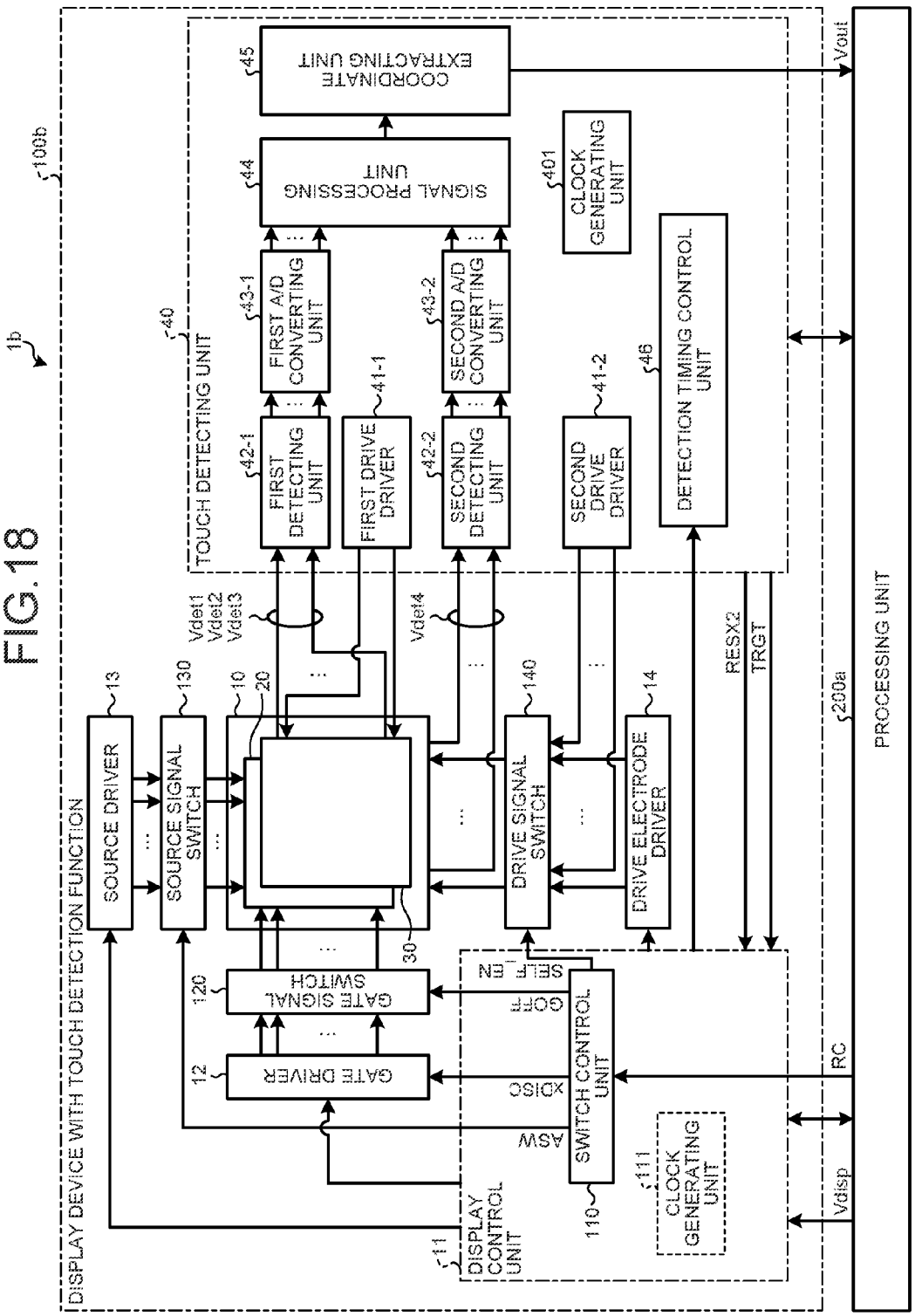
FIG. 18 is a block diagram of an exemplary configuration of a display device with a touch detection function and a display system according to a third embodiment.
Figure 19:
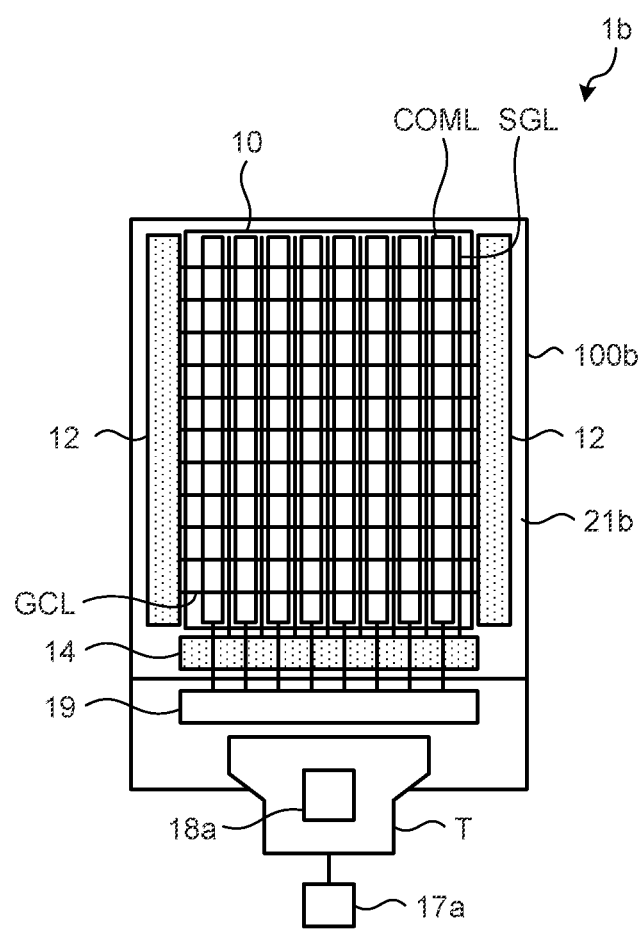
FIG. 19 is a schematic view of an example of a module on which the display device with a touch detection function according to the third embodiment is mounted.

FIG. 18 is a block diagram of an exemplary configuration of a display device with a touch detection function and a display system according to a third embodiment. FIG. 19 is a schematic view of an example of a module on which the display device with a touch detection function according to the second embodiment is mounted. Components identical with those described in the embodiments above are denoted by the same reference numerals and symbols, and overlapping explanation thereof will be omitted.

As illustrated in FIG. 18, the signal RC (floating-state cancellation signal) is output from a processing unit 200a in a display device 100b with a touch detection function and a display system 1b according to the present embodiment.

As illustrated in FIG. 19, the display device 100b with a touch detection function according to the third embodiment includes the display unit 10 with a touch detection function, the gate driver 12, the drive electrode driver 14, the display control IC (first IC) 19, and a touch detection IC (second IC) 18a. The display unit 10 with a touch detection function, the gate driver 12, and the drive electrode driver 14 are provided on a TFT substrate 21b that is a glass substrate. The display system 1b according to the third embodiment includes the display device 100b with a touch detection function and a host IC 17a.

The display control IC 19 is a chip mounted on the TFT substrate 21b by the COG technology and includes the display control unit 11.

The touch detection IC 18a is mounted on the flexible substrate T provided to a short side of the TFT substrate 21b and includes the touch detecting unit 40.

The host IC 17a is provided outside the display device 100b with a touch detection function and is coupled therewith via the flexible substrate T. The host IC 17a includes the processing unit 200a.

The following describes operations performed by the display system 1b according to the present embodiment in greater detail. FIG. 20 is an exemplary timing chart of the operations performed by the display system according to the third embodiment. Because the gesture determination flow performed by the display system 1b according to the second embodiment is the same as that of the first embodiment described with reference to FIG. 15, explanation thereof will be omitted.

In the example illustrated in FIG. 20, Row (A) indicates touch detection modes of the touch detection IC 18a. Row (B) indicates commands transmitted from the host IC 17a to the display control IC 19, and Row (C) indicates commands transmitted and received between the host IC 17a and the touch detection IC 18a. Row (D) indicates the drive signal supplied to the touch detection electrodes TDL, and Row (E) indicates the drive signal supplied to the drive electrodes COML. Row (F) indicates the signal RESX2 serving as a hardware reset signal output from the touch detection IC 18a to start a partial function including the switch control unit 110 mounted on the display control IC 19. Row (G) indicates the signal TRGT serving as a control signal output from the touch detection IC 18a to the display control IC 19. Row (H) indicates the signal RC (floating-state cancellation signal) output from the processing unit 200a to the switch control unit 110 of the display control unit 11. Row (I) indicates the display operation timing in the display control IC. Row (J) indicates the operation timing of the signals SELF_EN, GOFF, and xDISC output from the switch control unit 110 of the display control unit 11. Row (K) indicates the operation timing of the signal ASW output from the switch control unit 110 of the display control unit 11.

At the initial timing t0, the touch detection IC 18a is performing an operation of the second touch detection mode (Row (A) in FIG. 20) based on the self-capacitance of the touch detection electrodes TDL (Row (D) in FIG. 20). In the second touch detection mode, the touch detection IC 18a detects a touch operation performed in the sleep mode. Specifically, in the touch detection period (from the timing t0 to the timing t1) in which the touch detection IC 18a is operating in the second touch detection mode, the first drive driver 41-1 outputs the drive signal to the touch detection electrodes TDL at predetermined intervals. The first detecting unit 42-1 detects change in the voltage of the touch detection electrodes TDL (change in the voltage of the second touch detection signals Vdet2 received by the first detecting unit 42-1). Based on the change in the voltage of the second touch detection signals Vdet2, the touch detection IC 18a detects a touch operation. At this time, the display control IC 19 stops operations in portions other than a functional block that receives an external signal, such as the signal RESX2. The signals RESX2, TRGT, and RC output from the touch detection IC 18a are inactive (at a low level) (Row (F), Row (G), and Row (H) in FIG. 20).

If the touch detection IC 18a detects a touch operation in the second touch detection mode based on the self-capacitance of the touch detection electrodes TDL (Row (D) in FIG. 20), the touch detection IC 18a makes the signal RESX2 active (at a high level) (Row (F) in FIG. 20) at the timing t1. The signal RESX2 is transmitted from the touch detection IC 18a to the display control IC 19. If the signal RESX2 is made active at the timing t1, the display control IC 19 starts a partial function including the switch control unit 110.

At the timing t2, the touch detection IC 18a makes the signal TRGT active (at a high level) (Row (G) in FIG. 20) and starts the first drive driver 41-1 and the second drive driver 41-2. The signal TRGT is transmitted from the touch detection IC 18a to the display control IC 19. If the signal TRGT is made active at the timing t1, the switch control unit 110 of the display control IC 19 controls the gate driver 12 and the gate signal switch 120 to make the scanning signal lines GCL into a floating state. The switch control unit 110 also controls the source signal switch 130 to make the pixel signal lines SGL into a floating state. The switch control unit 110 also controls the drive signal switch 140 to couple the output from the second drive driver 41-2 with the drive electrodes COML. In the example illustrated in FIG. 20, the switch control unit 110 makes the signal xDISC for controlling the gate driver 12, the signal GOFF for controlling the gate signal switch 120, and the signal SELF_EN for controlling the drive signal switch 140 active (at a high level) (Row (J) in FIG. 20). The switch control unit 110 makes the signal ASW for controlling the source signal switch 130 inactive (at a low level) (Row (K) in FIG. 20).

At the timing t3, the touch detection IC 18a starts an operation of the third touch detection mode (Row (A) in FIG. 20). The touch detection IC 18a uses both the self-capacitance of the touch detection electrodes TDL and the self-capacitance of the drive electrodes COML at predetermined intervals (Row (D) and Row (E) in FIG. 20) to perform the operation of the third touch detection mode. In the third touch detection mode, the touch detection IC 18a detects coordinates at which the touch operation is performed in the sleep mode. Specifically, in the touch detection period (from the timing t3 to the timing t4) in which the touch detection IC 18a is operating in the third touch detection mode, the first drive driver 41-1 outputs the first drive signal to the touch detection electrodes TDL at predetermined intervals. The first detecting unit 42-1 detects change in the voltage of the touch detection electrodes TDL (change in the voltage of the third touch detection signals Vdet3 received by the first detecting unit 42-1). The second drive driver 42-1 outputs the second drive signal to the drive electrodes COML at predetermined intervals. The second detecting unit 42-2 detects change in the voltage of the drive electrodes COML (change in the voltage of the fourth touch detection signals Vdet4 received by the second detecting unit 42-2). Based on the change in the voltage of the third touch detection signals Vdet3 and the change in the voltage of the fourth touch detection signals Vdet4, the touch detection IC 18a detects the coordinates at which the touch operation is performed. In the touch detection period in the third touch detection mode, the switch control unit 110 temporarily cancels the floating state of the scanning signal lines GCL and the pixel signal lines SGL. In other words, in the touch detection period in the third touch detection mode, the switch control unit 110 makes the scanning signal lines GCL and the pixel signal lines SGL into the floating state intermittently. In the example illustrated in FIG. 20, the processing unit 200a of the host IC 17a temporarily makes the signal RC (floating-state cancellation signal) active (at a high level) (Row (H) in FIG. 20), the signal RC being a signal output to the switch control unit 110 of the display control IC 19. More specifically, the touch detection IC 18a transmits, to the processing unit 200a of the host IC 17a, signals (a, b, a', and b') giving instructions to temporarily turn off the touch detection function performed using both the self-capacitance of the touch detection electrodes TDL and the self-capacitance of the drive electrodes COML. In the example illustrated in FIG. 20, the processing unit 200a of the host IC 17a makes the signal RC active (at a high level) based on the signal a, inactive (at a low level) based on the signal b, active (at a high level) based on the signal a', and inactive (at a low level) based on the signal b' (Row (C) in FIG. 20). This operation inverts the logic of the signals xDISC, GOFF, SELF_EN, and ASW output from the switch control unit 110, thereby temporarily canceling the floating state of the scanning signal lines GCL and the pixel signal lines SGL. The floating state of the scanning signal lines GCL and the pixel signal lines SGL is preferably canceled at regular intervals in synchronization with one frame period in the normal operation mode (e.g., 60 Hz (one period=16.7 ms)), for example. The floating state of the scanning signal lines GCL and the pixel signal lines SGL is periodically canceled in this manner, whereby they are made into the floating state intermittently.

At the timing t4, the touch detection IC 18*a* transmits, to the host IC 17*a*, the command A indicating that a touch operation is detected (Row (C) in FIG. 20) and outputs the coordinates at which the touch operation is performed as the detection signal output Vout.

The host IC 17*a* stores therein a gesture that defines a trajectory pattern on the touch panel 30 to shift the mode of the display device 100*b* with a touch detection function from the sleep mode to the normal operation mode. The host IC 17*a* compares the trajectory of the coordinates detected by the touch detection IC 18*a* with the trajectory pattern. If the detected trajectory satisfies a predetermined condition defined as the trajectory pattern, the host IC 17*a* transmits the cancellation command B for canceling the sleep mode to the display control IC 19 at the timing t5 (Row (B) in FIG. 20). If the display control IC 19 receives the cancellation command B for canceling the sleep mode, the display control IC 19 starts a functional block required for an operation in the normal operation mode and shifts the mode of the display device 100*b* with a touch detection function to the normal operation mode (Row (I) in FIG. 20).

At the timing t6, the host IC 17*a* transmits, to the touch detection IC 18*a*, the shift command C for shifting the mode of the display device 100*b* with a touch detection function to the first touch detection mode in the normal operation mode (Row (C) in FIG. 20).

At the timing t7, the touch detection IC 18*a* starts an operation of the first touch detection mode in the normal operation mode (Row (A) in FIG. 20). In the first touch detection mode, the touch detection IC 18*a* detects, based on the mutual capacitance between the drive electrodes COML and the touch detection electrodes TDL, a touch operation and coordinates at which the touch operation is performed. Specifically, in the touch detection period (from the timing t7 to the timing t8) in which the touch detection IC 18*a* is operating in the first touch detection mode, the drive electrode driver 14 outputs the drive signal Vcom to the drive electrodes COML at predetermined intervals. The first detecting unit 42-1 detects change in the voltage of the touch detection electrodes TDL (change in the voltage of the first touch detection signals Vdet1 received by the first detecting unit 42-1). Based on the change in the voltage of the first touch detection signals Vdet1, the touch detection IC 18*a* detects a touch operation and coordinates at which the touch operation is performed. In the normal operation mode, the host IC 17*a* detects a gesture based on the coordinates detected in the first touch detection mode and performs control corresponding to the gesture. If no touch operation is performed for a certain period of time or if the user intentionally performs an operation (e.g., an operation to turn off display) to shift the mode of the display device 100*b* with a touch detection function to the sleep mode in the normal operation mode, the host IC 17*a* shifts the mode of the display device 100*b* with a touch detection function to the sleep mode.

In the example illustrated in FIG. 20, the host IC 17*a* transmits the shift command D for shifting the mode of the display device 100*b* with a touch detection function to the sleep mode to the display control IC 19 at the timing t8 (Row (B) in FIG. 20). The display control IC 19 stops the display operation in the normal mode.

At the timing t9, the host IC 17*a* transmits, to the touch detection IC 18*a*, the shift command E for shifting the mode of the display device 100*b* with a touch detection function to the second touch detection mode in the sleep mode. The touch detection IC 18*a* starts detection of a touch operation in the second touch detection mode based on the self-capacitance of the touch detection electrodes TDL and makes the signal RESX2 inactive (at a low level) (Row (F) in FIG. 20). If the signal RESX2 is made inactive at the timing t9, the display control IC 19 stops operations in portions other than the functional block that receives an external signal, such as the signal RESX2.

The present embodiment can also provide the same advantageous effects as those of the first and the second embodiments by performing the operations described above. Specifically, similarly to the first and the second embodiments, the pixel signal lines SGL and the scanning signal lines GCL are made into a floating state intermittently in the touch detection period in the third touch detection mode. As a result, the display device 100*b* with a touch detection function and the display system 1*b* according to the present embodiment can suppress reduction in the detection accuracy caused by capacitive coupling between the drive electrodes COML and the pixel signal lines SGL and between the drive electrodes COML and the scanning signal lines GCL. In addition, the display device 100*b* with a touch detection function and the display system 1*b* according to the present embodiment can suppress burn-in on the display panel 20 caused by unexpected application of voltage to the scanning signal lines GCL and the pixel signal lines SGL. It is thus possible to prevent display abnormality, such as bright black display, on the screen in the sleep mode. Similarly to the first and second embodiments, in the sleep mode of the present embodiment, the clock generating unit 401 of the touch detecting unit 40 generates a reference clock required to control the detection timing control unit 46 of the touch detecting unit 40 and the switch control unit 110 of the display control unit 11. This configuration stops operations of a functional block including the clock generating unit 111 other than a partial functional block including the switch control unit 110 of the display control unit 11 in the sleep mode. It is thus possible to reduce the power consumption in the sleep mode.

The present embodiment can provide the display device 100*b* with a touch detection function and the display system 1*b* that provide low power consumption when performing the gesture detection function in the sleep mode as a configuration including a display panel with a touch detection function obtained by integrating a display panel with a touch panel.

What is claimed is:

1. A display device with a touch detection function comprising:
   the touch panel comprises
   a plurality of first electrodes each extending in one direction;
   a plurality of second electrodes intersecting with the first electrodes in planar view and serving as common electrodes that supply a common potential to a plurality of pixels in a display area in which an image is displayed;
   a plurality of pixel signal lines and a plurality of scanning signal lines intersecting with each other in planar view, areas of the pixels being defined by the pixel signal lines and the scanning signal lines;

a gate driver that is coupled to the scanning signal lines;
a source driver that is coupled to the pixel signal lines;
a touch detecting circuit that performs touch detection in a touch detection period including a driving period and a non-driving period; and
a floating-state control circuit configured to make the pixel signal lines and the scanning signal lines into at least one of a floating state and an active state,
wherein in the driving period of the touch detection period, the floating-state control circuit makes the scanning signal lines and the pixel signal lines into the floating state by decoupling the scanning signal lines from the gate driver and decoupling the pixel signal lines from the source driver, and at least a first drive signal is applied to the first electrodes to perform self-capacitance touch detection and the second drive signal is applied to the second electrodes to perform self-capacitance touch detection; and
wherein in the non-driving period of the touch detection period, the floating-state control circuit cancels the floating state of the scanning signal lines and the pixel signal lines and makes the scanning signal lines and the pixel signal lines into the active state by coupling the scanning signal lines to the gate driver and coupling the pixel signal lines to the source driver, and no first drive signal is applied to the first electrodes and no second drive signal is applied to the second electrodes.

2. The display device with a touch detection function according to claim 1, wherein the touch detecting circuit transmits a floating-state cancellation signal to the floating-state control circuit in the touch detection period to temporarily cancel the floating state and activate the pixel signal lines and scanning signal lines.

3. The display device with a touch detection function according to claim 1, further comprising:
a display control circuit that controls display of the image;
a first integrated circuit (IC) on which the display control circuit and the floating-state control circuit are mounted; and
a second IC on which the touch detecting circuit is mounted.

4. The display device with a touch detection function according to claim 3, wherein the first IC stops an operation in at least a portion other than the floating-state control circuit in the touch detection period.

5. The display device with a touch detection function according to claim 1, further comprising:
a display control circuit that controls display of the image;
a first integrated circuit (IC) on which the display control circuit is mounted; and
a second IC on which the touch detecting circuit is mounted, wherein
the floating-state control circuit is provided to a substrate to which the pixel signal lines and the scanning signal lines are provided.

6. The display device with a touch detection function according to claim 3, wherein the second IC outputs a floating-state cancellation signal to the floating-state control circuit at regular intervals in the touch detection period to cancel the floating state and activate the pixel signal lines and scanning signal lines.

7. The display device with a touch detection function according to claim 5, wherein the second IC outputs a floating-state cancellation signal to the floating-state control circuit at regular intervals in the touch detection period to cancel the floating state and activate the pixel signal lines and scanning signal lines.

8. A display system comprising:
the display device with a touch detection function according to claim 1; and
a processing circuit that controls the display device with a touch detection function, wherein
the touch detection period is a period to perform touch detection in a sleep mode in which an image display function of displaying an image on the display panel is stopped, and
the processing circuit stores therein a gesture that defines a trajectory pattern on the touch panel to shift a mode of the display device with a touch detection function from the sleep mode to a normal operation mode in which the image display function is performed, and shifts, when a trajectory of coordinates detected in the touch detection period satisfies a predetermined condition defined as the trajectory pattern, the mode of the display device with a touch detection function from the sleep mode to the normal operation mode.

9. The display system according to claim 8, further comprising a host integrated circuit (IC) on which the processing circuit is mounted.

10. A display system comprising:
the display device with a touch detection function according to claim 1; and
a processing circuit that controls the display device with a touch detection function, wherein
the touch detection period is a period to perform touch detection in a sleep mode in which an image display function of displaying an image on the display panel is stopped, and
the processing circuit stores therein a gesture that defines a trajectory pattern on the touch panel to shift a mode of the display device with a touch detection function from the sleep mode to a normal operation mode in which the image display function is performed, and shifts, when a trajectory of coordinates detected in the touch detection period satisfies a predetermined condition defined as the trajectory pattern, the mode of the display device with a touch detection function from the sleep mode to the normal operation mode.

11. The display system according to claim 10, wherein the processing circuit outputs a floating-state cancellation signal to the floating-state control circuit at regular intervals in the touch detection period to cancel the floating state and activate the pixel signal lines and scanning signal lines based on a signal output from the touch detecting unit.

12. The display system according to claim 11, further comprising a host integrated circuit (IC) on which the processing circuit is mounted.

* * * * *